(12) United States Patent
Dittia et al.

(10) Patent No.: US 6,654,342 B1
(45) Date of Patent: Nov. 25, 2003

(54) ACCUMULATING AND DISTRIBUTING FLOW CONTROL INFORMATION VIA UPDATE MESSAGES AND PIGGYBACKED FLOW CONTROL INFORMATION IN OTHER MESSAGES IN A PACKET SWITCHING SYSTEM

(75) Inventors: Zubin D. Dittia, Sunnyvale, CA (US); William N. Eatherton, Sunnyvale, CA (US); John Andrew Fingerhut, San Mateo, CA (US); Michael B. Galles, Los Altos, CA (US); Jonathan S. Turner, St. Louis, MO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/521,278

(22) Filed: Mar. 7, 2000

(51) Int. Cl.[7] ................................................ G01R 31/08
(52) U.S. Cl. ....................................... 370/229; 370/236
(58) Field of Search ................................. 370/229, 230, 370/231–235, 236, 236.1, 236.2, 389, 390, 395.1, 395.4, 412–13, 414–19, 432; 709/233, 234, 235

(56) References Cited

U.S. PATENT DOCUMENTS

| 4,491,945 A | 1/1985 | Turner |
| 4,494,230 A | 1/1985 | Turner |

(List continued on next page.)

OTHER PUBLICATIONS

Stallings, Data And Computer Communications, 5th edition, 1997, pp.: 313, 317–318, 323.*
Jonathan S. Turner, "An Optimal Nonblocking Multicast Virtual Circuit Switch," Jun. 1994, Proceedings of Infocom, 8 pages.
Chaney et al., "Design of a Gigabit ATM Switch," Feb. 5, 1996, WUCS–96–07, Washington University, St. Louis, MO, 20 pages.
Turner et al., "System Architecture Document for Gigabit Switching Technology," Aug. 27, 1998, Ver. 3.5, ARL–94–11, Washington University, St. Louis, MO, 110 pages.

Primary Examiner—David Vincent
(74) Attorney, Agent, or Firm—The Law Offices of Kirk D. Williams

(57) ABSTRACT

Methods and apparatus are disclosed for accumulating and distributing flow control information via update messages and piggybacked flow control information in other messages. One implementation operates using at least two techniques. Using a first technique, for every packet entering the switching system from a line card, the switching system conveys flow control information (typically congestion or both congestion and no-congestion indications) for the packet's destination to the line card. Using a second technique, the switching system will periodically convey congestion and no-congestion indications for all destinations to the line cards. In one implementation, when the first technique is used to provide only congestion indications, the periodic distribution of flow control information using the second technique provides non-congested indications which allows the line cards and their sources to resume or begin sending to the non-congested destinations.

24 Claims, 23 Drawing Sheets

U.S. PATENT DOCUMENTS

| | | |
|---|---|---|
| 4,630,260 A | 12/1986 | Toy et al. |
| 4,734,907 A | 3/1988 | Turner |
| 4,829,227 A | 5/1989 | Turner |
| 4,849,968 A | 7/1989 | Turner |
| 4,893,304 A | 1/1990 | Giacopelli et al. |
| 4,901,309 A | 2/1990 | Turner |
| 5,127,000 A | 6/1992 | Henrion |
| 5,173,897 A | 12/1992 | Schrodi et al. |
| 5,179,551 A | 1/1993 | Turner |
| 5,179,556 A | 1/1993 | Turner |
| 5,229,991 A | 7/1993 | Turner |
| 5,253,251 A | 10/1993 | Aramaki |
| 5,260,935 A | 11/1993 | Turner |
| 5,339,311 A | 8/1994 | Turner |
| 5,367,523 A * | 11/1994 | Chang et al. ............... 370/235 |
| 5,402,415 A | 3/1995 | Turner |
| 5,491,801 A * | 2/1996 | Jain et al. ................... 709/241 |
| 5,815,667 A * | 9/1998 | Chien et al. ................ 709/232 |
| 5,842,040 A | 11/1998 | Hughes et al. |
| 5,901,138 A * | 5/1999 | Bader et al. ................ 370/229 |
| 6,272,107 B1 * | 8/2001 | Rochberger et al. ........ 370/216 |
| 6,304,549 B1 * | 10/2001 | Srinivasan et al. ......... 370/230 |
| 6,377,548 B1 * | 4/2002 | Chuah ........................ 370/233 |
| 6,505,253 B1 * | 1/2003 | Chiu et al. .................. 709/235 |

\* cited by examiner

ACCUMULATING AND DISTRIBUTING FLOW CONTROL INFORMATION VIA UPDATE MESSAGES AND PIGGYBACKED FLOW CONTROL INFORMATION IN OTHER MESSAGES IN A PACKET SWITCHING SYSTEM

FIELD OF THE INVENTION

This invention relates to communicating flow control information in packet switching systems; and more particularly, the invention relates to accumulating and distributing flow control information via update messages and piggybacked flow control information in other messages in a packet switching system.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

As used herein, the term "packet" refers to packets of all types, including, but not limited to, fixed length cells and variable length packets. Moreover, these packets may contain one or more types of information, including, but not limited to, voice, data, video, and audio information. Furthermore, the term "system" is used generically herein to describe any number of components, packet switch elements, packet switches, networks, computer and/or communication devices or mechanisms, or combinations thereof.

Consumers and designers of these systems typically desire high reliability and increased performance at a reasonable price. A commonly used technique for helping to achieve this goal is for these systems to provide multiple paths between a source and a destination. Packets of information are then dynamically routed and distributed among these multiple paths. It is typically more cost-effective to provide multiple slower rate links or switching paths, than to provide a single higher rate path. Such designs also achieve other desired performance characteristics.

Under certain circumstances and typically for a limited duration, these switching systems can have internal congestion as well as congestion at the output ports. The amount of the congestion can be decreased if the ports sending packets over the congested paths or to the congested output ports stop or decrease sending packets for a period of time. A mechanism is needed to provide this flow control information to the sending ports.

Many prior communications systems, such as early routers and switches, were typically bus based with no internal buffering. In such systems, when there was congestion, either the output line cards would drop cells locally or the output line cards would send messages back to the input line cards informing them of the congestion. Such systems either sent a broadcast message for each flow control data item, or sent multiple messages. Such techniques required a significant amount of bandwidth. New methods and apparatus are needed to efficiently communicate flow control information between output and input line cards.

Additionally, in other communications systems which had buffered switching fabrics, fabrics typically turn off all traffic going to all destinations when their buffers become filled, regardless of which internal pathway or destination is congested. Other prior systems support event-based flow control, wherein the fabric will individually turn on or off traffic going to individual destinations by sending separate messages for each such event to the input line cards.

Once again, such prior approaches are deficient in their approach because they over-react (e.g., stopping traffic to non-congested ports) and/or because they require a significant amount of bandwidth to communicate flow control information. New methods and apparatus are needed to efficiently communicate flow control information between output and input line cards, and between the switch fabric and input line cards.

New methods and systems are needed for a packet switching system to efficiently and effectively react to the generated and communicated flow control information, especially when multiple sources are sending to a single output. These sources when turned off to a particular destination may accumulate packets in their buffers. If all these sources begin sending at the same time in response to a flow control message turning on the traffic to the particular output, congestion may quickly return and force the sources to be turned off, as well as possibly overflowing buffers within the packet switching system.

SUMMARY OF THE INVENTION

A method is disclosed for propagating flow control information from a first element to a second element of a packet switching system. In one embodiment, the first element sends a flow control data structure update message to a second element. The first element also includes flow control information in a first non-flow control message being sent from the first element to the second element.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
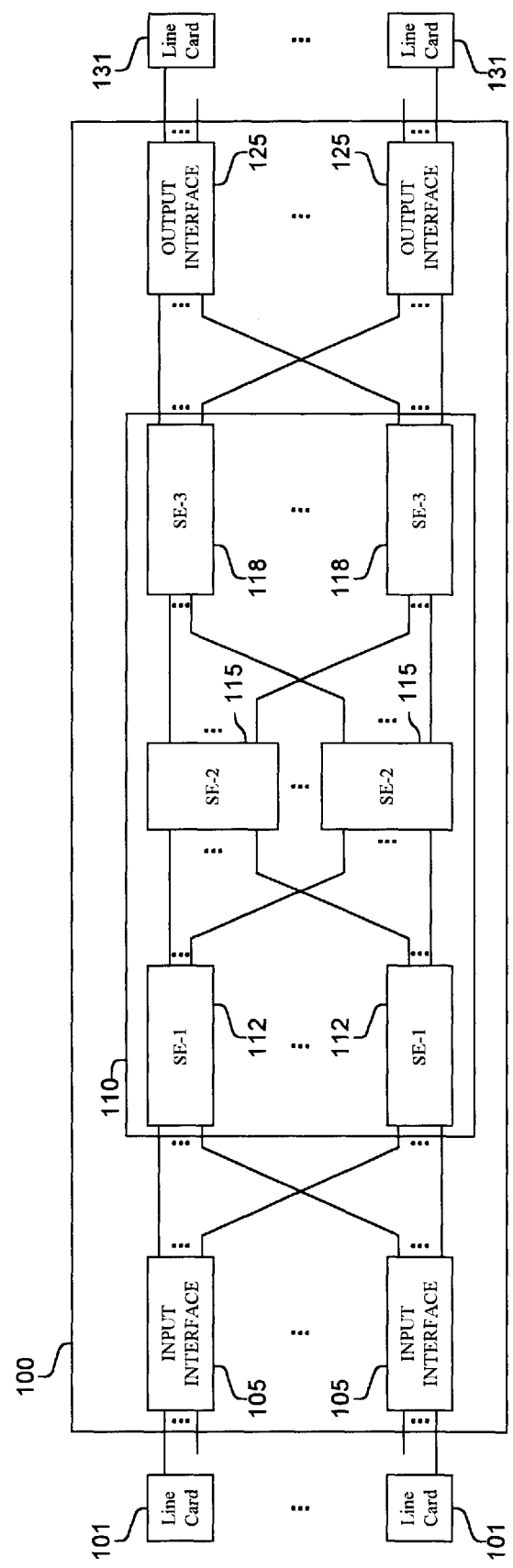
FIGS. 1A–C are block diagrams of a few of many possible embodiments of a switching system.

Methods and apparatus are disclosed for accumulating, distributing and reacting to flow control information in a packet switching system. Such methods and apparatus are not limited to a single packet switching environment. Rather, the architecture and functionality taught herein are extensible to an unlimited number of packet switching environments and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, inter alia, systems, integrated circuit chips, methods, and computer-readable medium containing instructions. The embodiments described hereinafter embody various aspects and configurations within the scope and spirit of the invention.

Aggregating Distributing and Reacting to Flow Control Information

Methods and apparatus are disclosed for accumulating and distributing flow control information in a packet switching system. In one embodiment, flow control information being sent from one or more line cards (or ports thereof) is collected and distributed to all other line cards (or some subset thereof). It is desirable in certain packet switching systems to communicate the status of internal queues and other port status information from an individual port to all other ports (or at least those which are communicating with the individual port). The amount of information being sent from the individual port is typically very small, such as on the order of a few bits or bytes, especially when compared to the minimum packet size sent through a packet switch. By accumulating the information from multiple individual ports and then broadcasting the collected flow control information, a vast amount of switch fabric resources (e.g., bandwidth) can be saved. In one embodiment, flow control information is sent to a destination (e.g., a "mailbox") within a packet switching fabric which includes a memory in which flow control information is accumulated. After a period of time or based on the occurrence of some event, the accumulated flow control information is broadcast to the relevant ports or subset of ports. This same mechanism may be used to distribute most any type of information (e.g., flow control information, signaling information, and data internal or external to a packet switch or packet switching system). In one embodiment, line cards distribute information among themselves using this mechanism, where this information may include, but not limited to flow control information, data, and/or signaling information about their status, incoming signals (including signaling information pertaining to subrate channels within a received multiplexed signal), etc.

Methods and apparatus are also disclosed for accumulating and distributing flow control information via update messages and piggybacked flow control information in other messages. This flow control information may describe some internal or external conditions of the packet switching system. For example, the accumulated and distributed flow control information may include indications delivered to the line cards of states of congestion or no such congestion for traffic headed to certain destinations or over certain paths. In response, a line card sending information through a congested portion of the switching system may slow down or stop sending traffic to a particular destination or group of destinations that are determined by the fabric to be in a congested state. In response to flow control information indicating a non-congested state, a line card may resume or increase the rate at which it is sending traffic to the particular destination or group of destinations.

One embodiment for accumulating and distributing flow control information operates using at least two techniques. For every packet entering the switching system from a line card, the switching system conveys flow control information (typically congestion or both congestion and no-congestion indications) for the packet's destination to the line card. This provides rapid delivery of congestion indications to the line cards, allowing the line cards to react quickly to congestion by rapidly turning off or slowing down sources feeding congested destinations. Additionally, the switching system will periodically convey congestion and no-congestion indications for all destinations to the line cards. When the first technique only provides congestion indications, the period conveyance of flow control information provides both congested and non-congested indications which allows the line cards and their sources to resume or begin sending to the non-congested destinations.

As disclosed herein, flow control information is distributed and aggregated by a packet switching system using various techniques and by an extensible number of embodiments. In one embodiment, the line card maintains its own data structure indicating flow control information for at least the destinations it is communicating with or all possible destinations to which it can send information. As described herein, flow control information is delivered to the line card for and/or from each destination. Therefore, it is possible for the line card to hold or throttle-back its data being transmitted to the congested ports and/or line cards, rather than shutting off all transmission traffic. Thus, non-congested destinations can continue to receive data. In an embodiment, a line card will maintain a queue for each destination to which it is sending data, within its memory. Control logic then controls the placing of the incoming data into these queues and for taking the data out of the queues and sending the data, typically in the form of packets, to the packet switch.

When there is no congestion in the packet switch or at the output line card, then all line cards can send their data without concern. However, after a period of congestion when an input line card has stored information waiting to be transmitted to the packet switch, the line card must employ some method to transmit the queued information as well as newly arriving information. Thus, the line card must allocate the bandwidth of the link or links to the packet switch among packets containing the information waiting to be transmitted.

In one embodiment, the effect of congested destinations and queues containing multiple data items is isolated from traffic being sent to other destinations through a fair distribution allocation scheme. In one embodiment, as information going to a given destination arrives at a line card, priority outgoing packet time slots are allocated for that destination. In this fashion, each destination is given the opportunity to send information at its arrival rate. In the remaining bandwidth or packet cycles available on the outgoing link, the destination queues containing information retained due to a congestion condition are serviced. Spare bandwidth and packet times are typically available because the outgoing packet rate from the line card to the packet switch is typically engineered to be faster than the incoming packet rate to the line card for arriving data. Additional bandwidth and packet times become available when other destinations become congested.

Methods and apparatus are also disclosed for responding to received flow control messages indicating a previously congested port is now in a non-congested state. Many different components that have packets to send to a particular output will receive an indication that they are now allowed to send these packets at roughly the same time as the other components. If all components start sending at the same time, then the packet switch might become congested, possibly very quickly. If the packet switch cannot respond and transmit flow control messages to all of these sources fast enough, certain internal buffers could overflow and thus packets might be lost. One embodiment causes components to start sending to the destination at varying times to gradually increase the traffic being sent to the destination. In this manner, the traffic in the packet switch gradually rises which allows buffers within the packet switch to drain while new traffic is arriving, and allows the packet switch time to react and throttle-back the traffic in a reasonable manner should paths leading to the output become congested.

In one embodiment, a backoff delay is individually determined by each component (e.g., a line card) of a packet switching system. This backoff delay corresponds to a time duration that a component of the packet switching system waits before sending a packet to a destination after receiving flow control information (e.g., receives an XON) indicating that the component is allowed to send packets when the component has been previously prevented from sending a packet to the destination (e.g., in an XOFF condition for the destination). In one embodiment, a component waits a random period of time. The range of possible values for this random period of time may be adjusted depending on how long of a period the component perceived the destination as being in a congested or in a non-congested state. For example, if the component perceived the destination as being non-congested for only a short duration before receiving a congested indication for the destination, then the range of possible values for this random period may be increased so that the components of the packet switch may start sending packets to this destination over a longer period of time.

Details of Exemplary Embodiments

FIGS. 1A–3C and their discussion herein are intended to provide a description of various exemplary packet switching systems. FIGS. 1A–C illustrate the basic topology of different exemplary packet switching systems. FIG. 1A illustrates an exemplary packet switch 100 having multiple inputs and outputs and a single interconnection network 110. FIG. 1B illustrates an exemplary packet switch 140 having multiple interconnection networks 141 and folded input and output interfaces 149. FIG. 1C illustrates an exemplary folded packet switch 160 having multiple interconnection networks 161 and folded input and output interfaces 169. Embodiments of each of these packet switches 100, 140 and 160 receive, generate, accumulate, distribute, and react to flow control information in the manners disclosed herein. Of course, the invention is not limited to these illustrated operating environments and embodiments, and the packet switching systems may have more or less elements.

FIG. 1A illustrates an exemplary embodiment of a packet switch 100. Packet switch 100 comprises multiple input interfaces 105, interconnection network 110, and output interfaces 125. Input interfaces 105 and output interfaces 125 are both coupled over multiple links to interconnection network 110. Line cards 101 and 131 are coupled to input interfaces 105 and output interfaces 131. In certain embodiments including other packet switching topologies, line cards or their functionality may be included in the packet switch itself, or as part of the packet switching system.

In one embodiment, interconnection network 110 comprises multiple switch elements SE-1 112, SE-2 115, and SE-3 118 that are interconnected by multiple links. Line cards 101 and 131 may connect to other systems (not shown) to provide data items (e.g., packets) to be routed by packet switch 100. Flow control information may be generated, consumed, or processed at one or more of the line cards 101, 131, input interfaces 105, switch elements SE-1 112, SE-2 115, and SE-3 118, output interfaces 125, and/or other locations within packet switch 100 or the packet switching system.

Figure 1B:
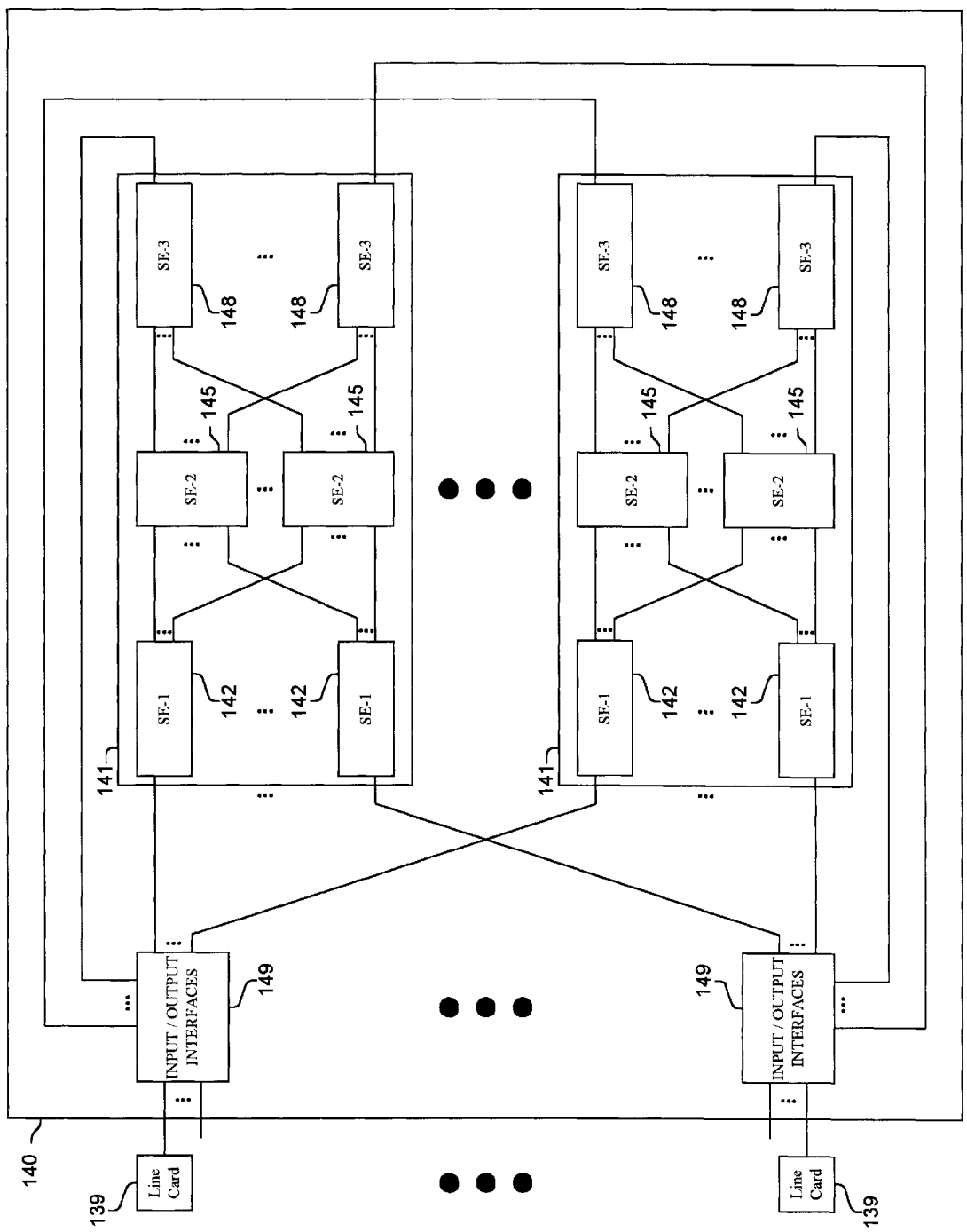

FIG. 1B illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Flow control information may be generated, consumed, or processed at one or more of the line cards 139, input and output interfaces 149, switch elements SE-1 142, SE-2 145, and SE-3 148, and/or other locations within packet switch 140 or the packet switching system.

Figure 1C:
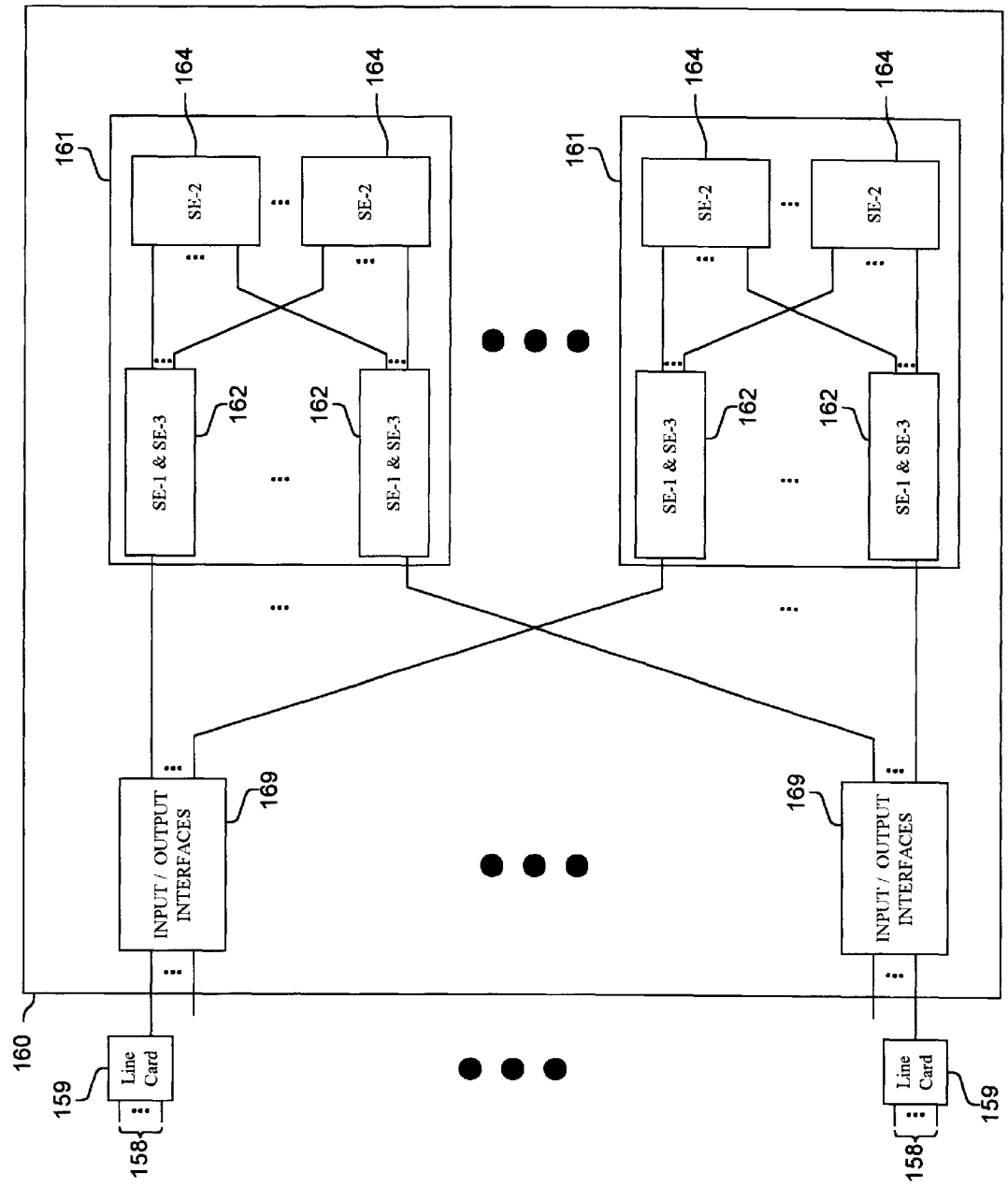

FIG. 1C illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Flow control information may be generated, consumed, or processed at one or more of the line cards 159, input and output interfaces 169, switch elements SE-1 & SE-3 162 and SE-2 164, and/or other locations within packet switch 160 or the packet switching system.

Figure 2A:
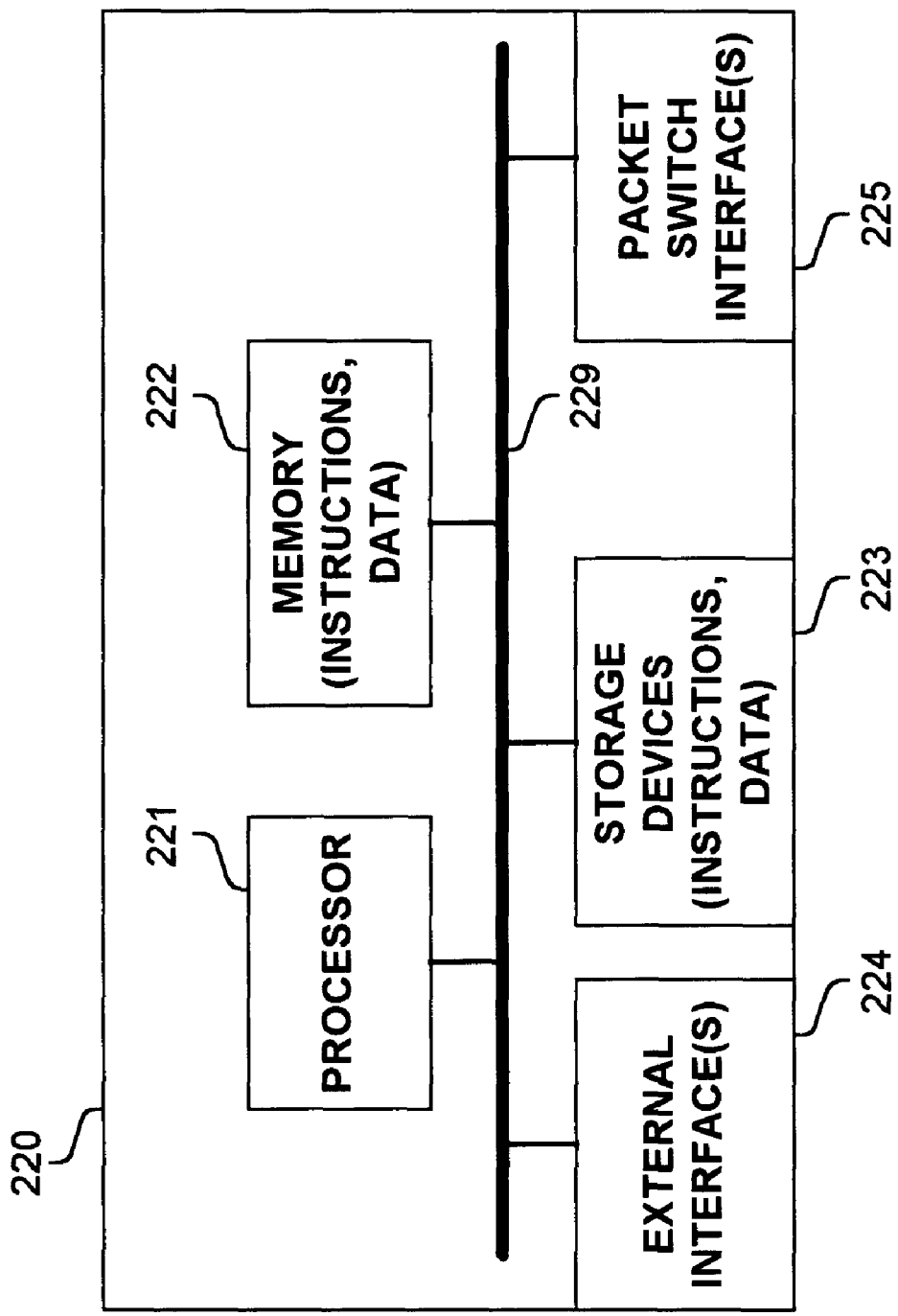
FIGS. 2A–C are block diagrams illustrating exemplary embodiments of a packet switching system component, such as, for example, a line card and/or input/output interface.
Figure 2B:
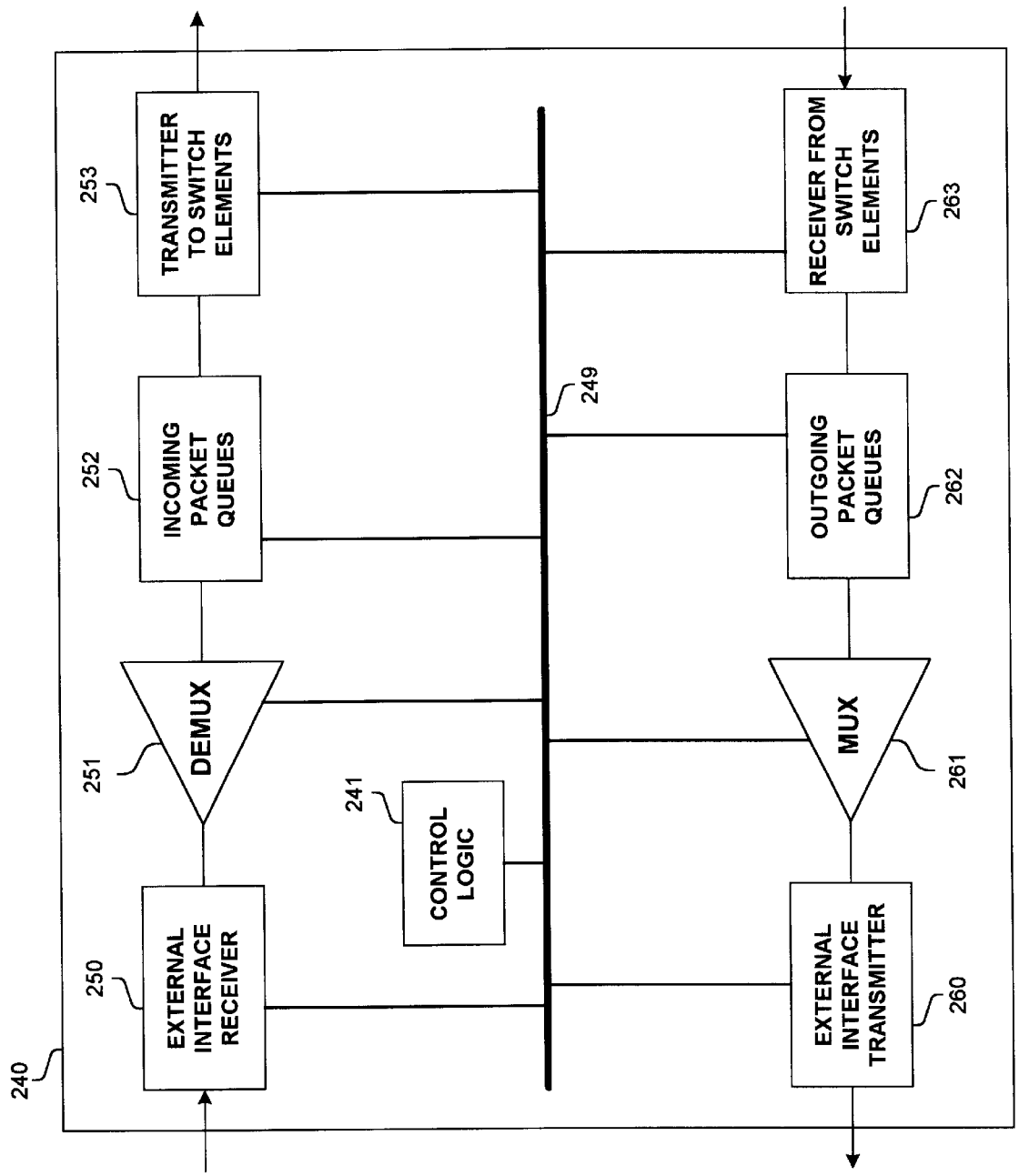
Figure 2C:
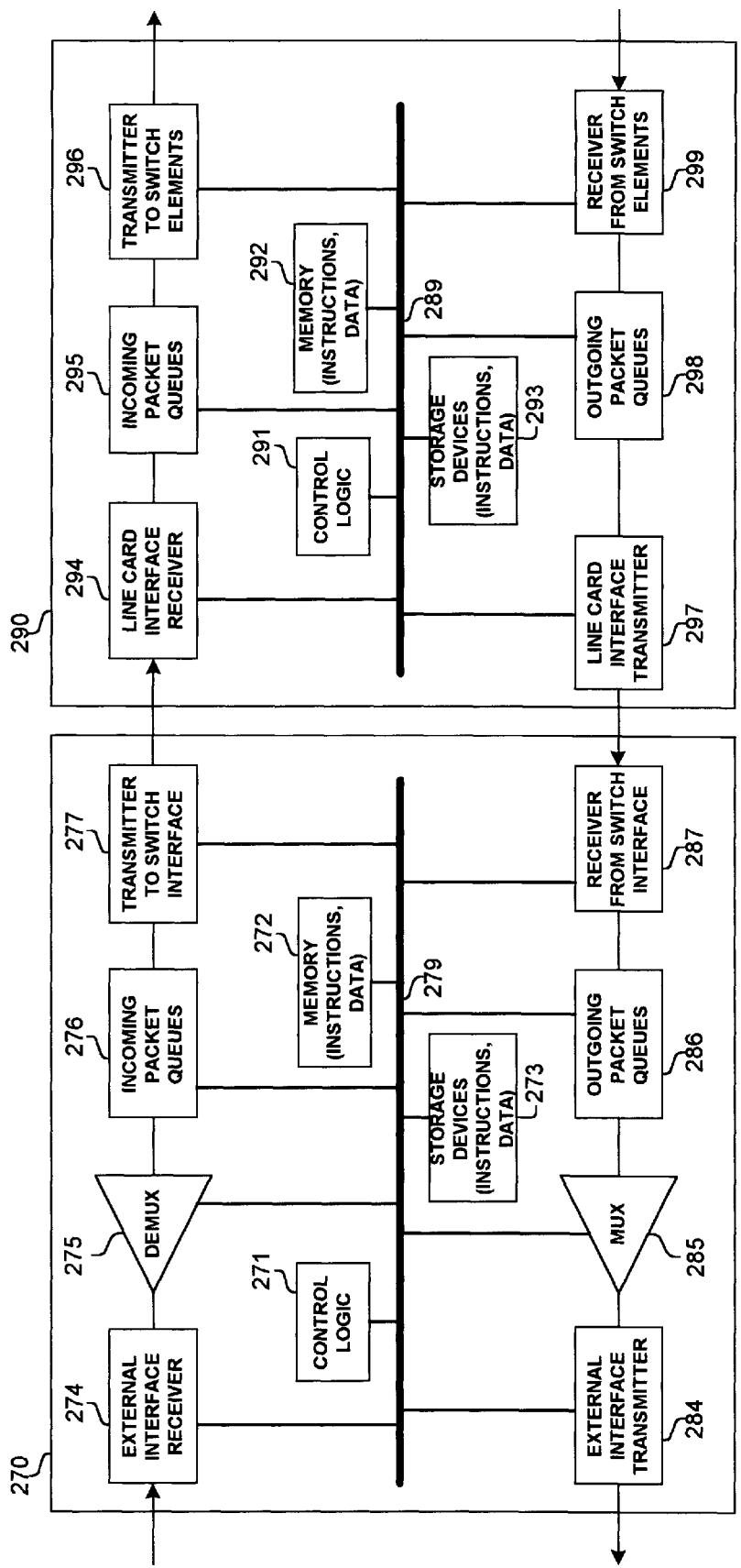

FIGS. 2A–C illustrate three of numerous possible embodiments of a line card, input interface, output interface, and/or input/output interface. For illustrative purposes, only single transmitters and receivers may be shown. It should be clear to one skilled in the art that multiple transmitters and receivers may be used to communicate with multiple sources and destinations (e.g., line cards, switch fabrics, etc.).

FIG. 2A illustrates one embodiment 220 comprising a processor 221, memory 222, storage devices 223, and one or more external interface(s) 224, and one or more packet switch interface(s) 225, and one or more internal communications mechanisms 229 (shown as a bus for illustrative purposes). External interface(s) 224 receive and send external signals to one or more communications devices or networks (e.g., one or more networks, including, but not limited to the Internet, intranets, private or public telephone, cellular, wireless, satellite, cable, local area, metropolitan area and/or wide area networks). Memory 222 is one type of computer-readable medium, and typically comprises random access memory (RAM), read only memory (ROM), integrated circuits, and/or other memory components. Memory 222 typically stores computer-executable instructions to be executed by processor 221 and/or data which is manipulated by processor 221 for implementing functionality in accordance with certain embodiments of the invention. Storage devices 223 are another type of computer-readable medium, and typically comprise disk drives, diskettes, networked services, tape drives, and other storage devices. Storage devices 223 typically store computer-executable instructions to be executed by processor 221 and/or data which is manipulated by processor 221 for implementing functionality in accordance with certain embodiments of the invention. Embodiment 220 generates, consumes, processes and reacts to flow control information.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 2B illustrates embodiment 240 having a single element providing the functionality of a line card and an input/output interface, for example that of line card 159 and input/output interface 169 (FIG. 1C). FIGS. 2B–C will be described in relation to FIG. 1C for illustrative purposes; however, these embodiments could be used with other packet switch topologies and other implementations and embodiments. Embodiment 240 comprises control logic 241 implementing functionality in accordance with certain embodiments of the invention. In one embodiment control logic 241 includes memory for storage of data and instructions. Control logic 241 is connected to other components of embodiment 240 via one or more internal communications mechanisms 249 (shown as a bus for illustrative purposes). External interface receiver 250 receives external signals, separates the signals into channels using demultiplexor 251 into multiple streams of packets which are temporarily stored in incoming packet buffer 252. At the appropriate time, a packet is sent to the appropriate switch element SE-1 & SE-3 162 via transmitter to switch elements 253. Packets are received from switch elements SE-1 & SE-3 162 at the receiver from switch elements 263 and placed in the outgoing packet buffer 262. Multiplexor 261 extracts the packets and creates a multiplexed signal which is transmitted via external interface transmitter 260. Additionally, control logic 241 receives, generates, processes and reacts to flow control information as described hereinafter.

FIG. 2C illustrates an embodiment of a line card 270 and a switch interface 290, which could correspond to line card 159 and input/output interfaces 169 illustrated in FIG. 2C.

The embodiment of line card 270 illustrated in FIG. 2C includes control logic 271 implementing functionality in accordance with certain embodiments of the invention. Control logic 271 is connected to other components of line card 270 via one or more internal communications mechanisms 279 (shown as a bus for illustrative purposes). In one embodiment, control logic 271 includes memory for storing instructions and data. Line card 270 also includes optional additional memory 272 and storage devices 273. External interface receiver 274 receives external signals 201 (FIG. 2), separates the signals into channels using demultiplexor 275 into multiple streams of packets which are temporarily stored in incoming packet buffer 276. At the appropriate time, a packet is sent to switch interface 290 via transmitter to switch interface 277. Packets are received from switch interface 290 at the receiver from switch interface 287 and placed in the outgoing packet buffer 286. Multiplexor 285 extracts the packets and creates a multiplexed signal which is transmitted via external interface transmitter 284. In one embodiment, control logic 271, referencing a data structure within control logic 271 or memory 272, stores flow control information which could be received from an external source, a packet switch, or internally generated. Embodiment 270 receives, generates, processes and reacts to flow control information as described hereinafter.

The embodiment of input/output interface 290 illustrated in FIG. 2C includes control logic 291 implementing functionality in accordance with certain embodiments of the invention. Control logic 291 is connected to other components of switch interface 290 via one or more internal communications mechanisms 289 (shown as a bus for illustrative purposes). In one embodiment, control logic 291 includes memory for storing instructions and data. Switch interface 290 also includes optional additional memory 292 and storage devices 293. Line card receiver 294 receives packets from line card 270 temporarily stores the packets in incoming packet buffer 295. At the appropriate time, a packet is sent to an appropriate switch element SE-1 & SE-3 162 via transmitter to switch elements 296. Packets are received from switch elements SE-1 & SE-3 162 at the receiver from switch elements 299 and placed in the outgoing packet buffer 298. Line card interface transmitter 297 then forwards these to line card 270. In one embodiment, control logic 291, referencing a data structure within control logic 291 or memory 292, stores flow control information which could be received from a line card, packet switch, or internally generated. Embodiment 290 receives, generates, processes and reacts to flow control information as described hereinafter.

Figure 3A:
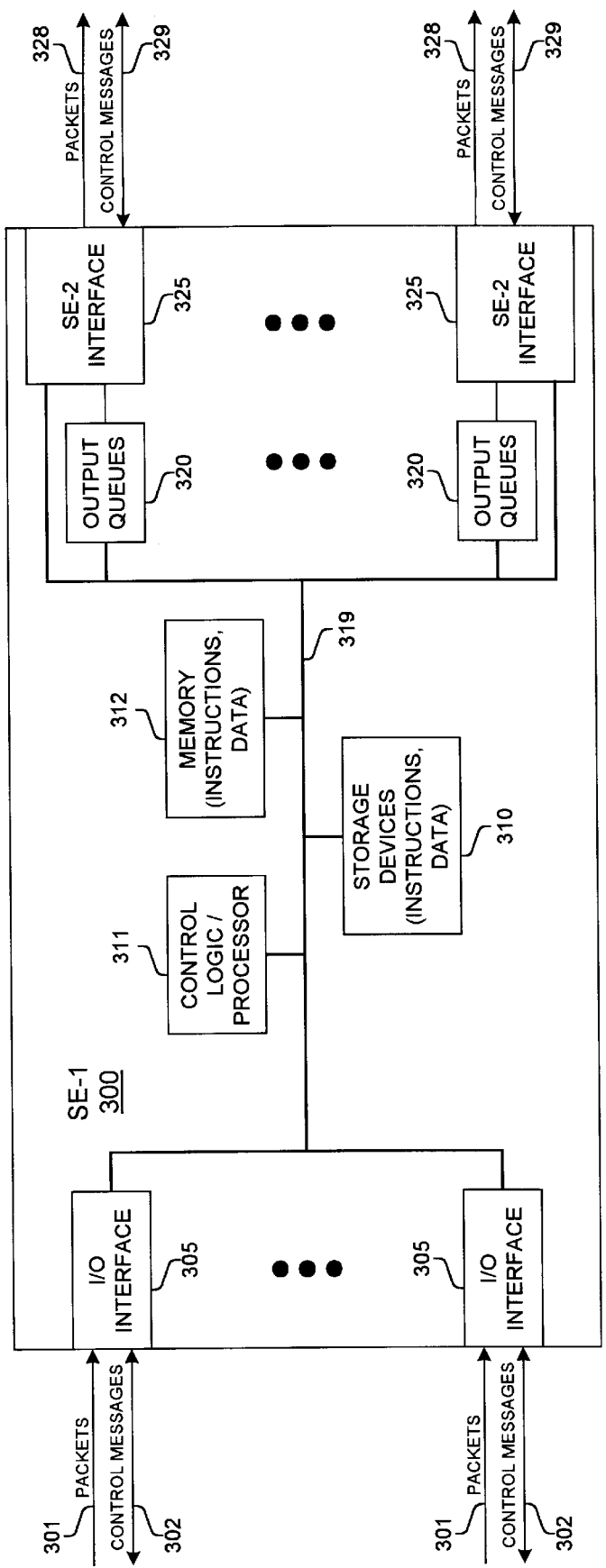
FIGS. 3A–C are block diagrams of exemplary switching fabric components.
Figure 3B:
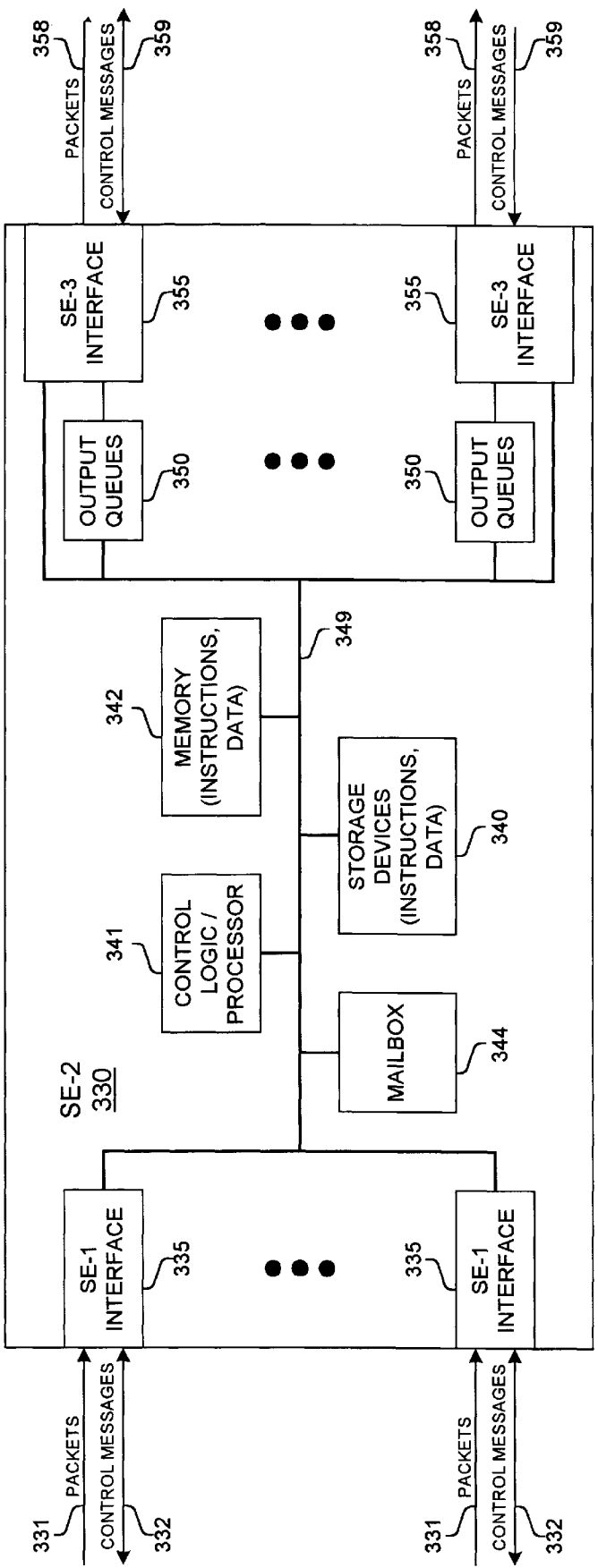
Figure 3C:
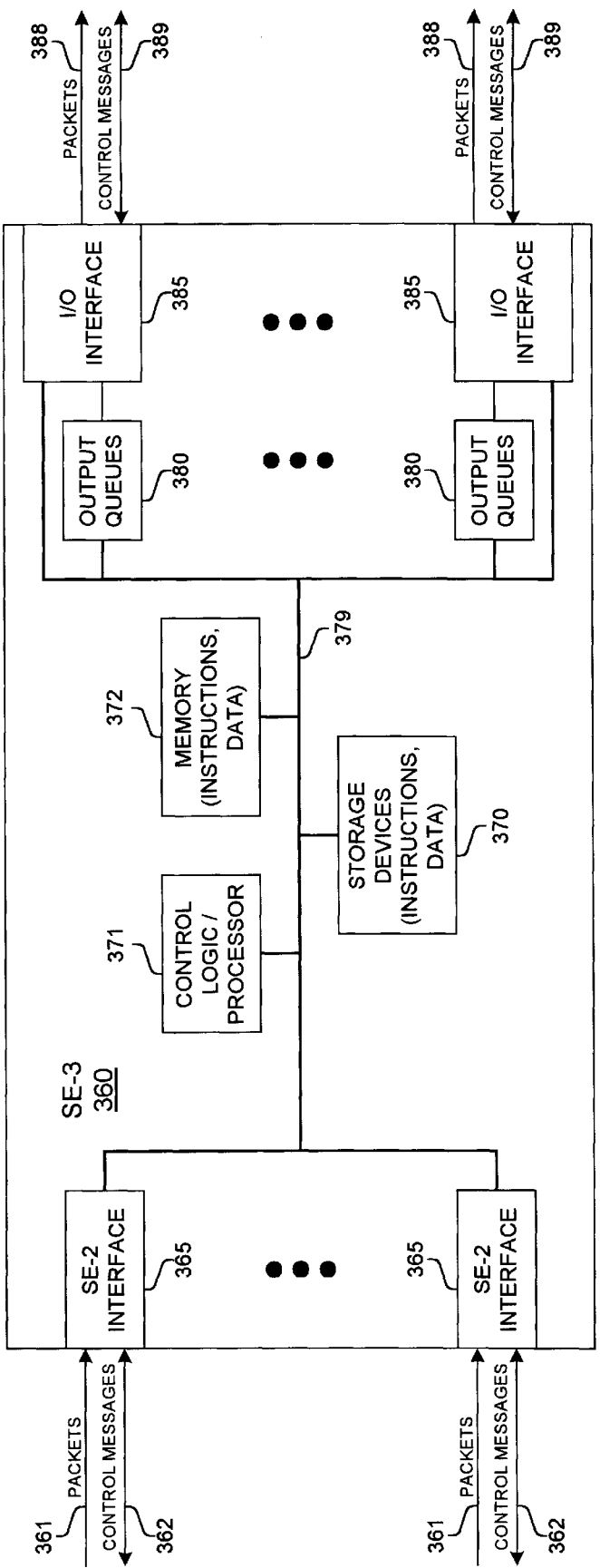

FIGS. 3A–C illustrate exemplary embodiments of switching elements and/or their components in accordance with certain embodiments of the invention. FIG. 3A is a block diagram of a first stage switching element, SE-1 300. FIG. 3B is a block diagram of a second stage switching element SE-2 330. FIG. 3C is a block diagram of a third stage switching element SE-3 360. As would be understood by one skilled in the art, the invention is not limited to these or any other embodiment described herein. Rather, the invention as described herein is extensible to an unlimited number of embodiments and implementations.

FIG. 3A illustrates an embodiment of SE-1 300 comprising control logic and/or processor 311 (hereinafter "control logic"), memory 312, storage devices 310, I/O interfaces 305, output queues 320, SE-2 interfaces 325, and one or more internal communications mechanisms 319 (shown as a bus for illustrative purposes). In certain embodiments, control logic 311 comprises custom control circuitry for controlling the operation of SE-1 300 and no storage device 310 is used. Memory 312 is one type of computer-readable medium, and typically comprises random access memory (RAM), read only memory (ROM), integrated circuits, and/or other memory components. Memory 312 typically stores computer-executable instructions to be executed by control logic 311 and/or data which is manipulated by control logic 311 for implementing functionality in accordance with certain embodiments of the invention. Storage devices 310 are another type of computer-readable medium, and typically comprise disk drives, diskettes, networked services, tape drives, and other storage devices. Storage devices 310 typically store computer-executable instructions to be executed by control logic 311 and/or data which is manipulated by control logic 311 for implementing functionality in accordance with certain embodiments of the invention.

SE-1 300 generates, consumes, processes and reacts to flow control information as further described in detail hereinafter. Briefly first, each SE-1 300 receives packets 301 and exchanges control messages 302 over one or more links with one or more input interfaces (not shown) such as input/output interface 290 (FIG. 2C) via I/O interfaces 305. In other embodiments, data packets and control messages are transmitted over a common link or links, and/or communication interfaces have a folded topology. Additionally, each SE-1 300 sends packets 328 and exchanges control messages 329 over one or more links with one or more SE-2 elements (not shown) such as SE-2 330 (FIG. 3B) via SE-2 interfaces 325. Control logic 311 receives control packets containing flow control information, and updates its flow control data structure stored in memory 312. SE-1 300 distributes flow control information to other packet switching components by sending control packets and "piggybacking" flow control information in other messages, such as, for example, including flow control information in reserved fields of data messages or other control messages (e.g., acknowledgment or clear-to-send control messages) being sent. Outgoing packets and control messages are placed in output queues 320. In one embodiment, there is an output queue 320 for each destination, or for each class of service for each destination.

FIG. 3B illustrates an embodiment of SE-2 330 comprising control logic and/or processor 341 (hereinafter "control logic"), memory 342, storage devices 340, mailbox 344, SE-1 interfaces 335, output queues 350, SE-3 interfaces 355, and one or more internal communications mechanisms 349 (shown as a bus for illustrative purposes). In certain embodiments, control logic 341 comprises custom control circuitry for controlling the operation of SE-2 330 and no storage device 340 is used. Memory 342 is one type of computer-readable medium, and typically comprises random access memory (RAM), read only memory (ROM), integrated circuits, and/or other memory components. Memory 342 typically stores computer-executable instructions to be executed by control logic 341 and/or data which is manipulated by control logic 341 for implementing functionality in accordance with certain embodiments of the invention. Storage devices 340 are another type of computer-readable medium, and typically comprise disk drives, diskettes, networked services, tape drives, and other storage devices. Storage devices 340 typically store computer-executable instructions to be executed by control logic 341 and/or data which is manipulated by control logic 341 for implementing functionality in accordance with certain embodiments of the invention.

SE-2 330 generates, consumes, processes and reacts to flow control information as further described in detail hereinafter. Briefly first, each SE-2 330 receives packets 331 and exchanges control messages 332 over one or more links with one or more SE-1 elements (not shown) such as SE-1 300 (FIG. 3A) via SE-1 interfaces 335. In other embodiments, data packets and control messages are transmitted over a common link or links, and/or communication interfaces have a folded topology. For example, the communications functions of SE-1 interface 335 and SE-3 interface 355 could be combined, which is particularly useful in an embodiment where SE-1 300 (FIG. 3A) and SE-3 360 (FIG. 3C) are implemented on a single component. (e.g., chip or circuit board). Additionally, each SE-2 330 sends packets 358 and exchanges control messages 359 over one or more links with one or more SE-3 elements (not shown) such as SE-3 360 (FIG. 3C) via SE-3 interfaces 355. In one embodiment using a folded topology, the links between (a) SE-2 330 and SE-1 300 and (b) SE-2 330 and SE-3 360 are the same links. Control logic 341 receives control packets containing flow control information, and updates its flow control data structure stored in memory 342. Additionally, mailbox 344 receives flow control information to be broadcast through the packet switch or packet switching system, such as to all the output ports or to all the attached line cards. The functionality of mailbox 344 could also be performed by control logic 341 using memory 342. SE-2 330 distributes flow control information to other packet switching components by sending control packets as well as "piggybacking" or including flow control information in reserved fields of other control messages (e.g., acknowledgment or clear-to-send control messages) being sent. Outgoing packets and control messages are placed in output queues 350. In one embodiment, there is an output queue 350 for each destination, or for each class of service for each destination.

FIG. 3C illustrates an embodiment of SE-3 360 comprising control logic and/or processor 371 (hereinafter "control logic"), memory 372, storage devices 370, SE-2 interfaces 365, output queues 380, I/O interfaces 385, and one or more internal communications mechanisms 379 (shown as a bus for illustrative purposes). In certain embodiments, control logic 371 comprises custom control circuitry for controlling the operation of SE-3 360 and no storage device 370 is used. Memory 372 is one type of computer-readable medium, and typically comprises random access memory (RAM), read only memory (ROM), integrated circuits, and/or other memory components. Memory 372 typically stores computer-executable instructions to be executed by control logic 371 and/or data which is manipulated by control logic 371 for implementing functionality in accordance with certain embodiments of the invention. Storage devices 370 are another type of computer-readable medium, and typically comprise disk drives, diskettes, networked services, tape drives, and other storage devices. Storage devices 370 typically store computer-executable instructions to be executed by control logic 371 and/or data which is manipulated by control logic 371 for implementing functionality in accordance with certain embodiments of the invention.

SE-3 360 generates, consumes, processes and reacts to flow control information as further described in detail hereinafter. Briefly first, each SE-3 360 receives packets 361 and exchanges control messages 362 over one or more links with one or more SE-2 elements (not shown) such as SE-2 330 (FIG. 3B) via SE-2 interfaces 365. In other embodiments, data packets and control messages are transmitted over a common link or links, and/or communication interfaces have a folded topology. Additionally, SE-3 360 sends packets 388 and exchanges control messages 389 over one or more links with one or more output interface elements (not shown) such as Input/Output interface 390 (FIG. 2C) via I/O interfaces 385. Control logic 371 receives control packets containing flow control information, and updates its flow control data structure stored in memory 372. SE-3 360 distributes flow control information to other packet switching components by sending control packets as well as "piggybacking" or including flow control information in reserved fields of other control messages (e.g., acknowledgment or clear-to-send control messages) being sent. Outgoing packets and control messages are placed in output queues 380. In one embodiment, there is an output queue 380 for each destination, or for each class of service for each destination.

Figure 4:
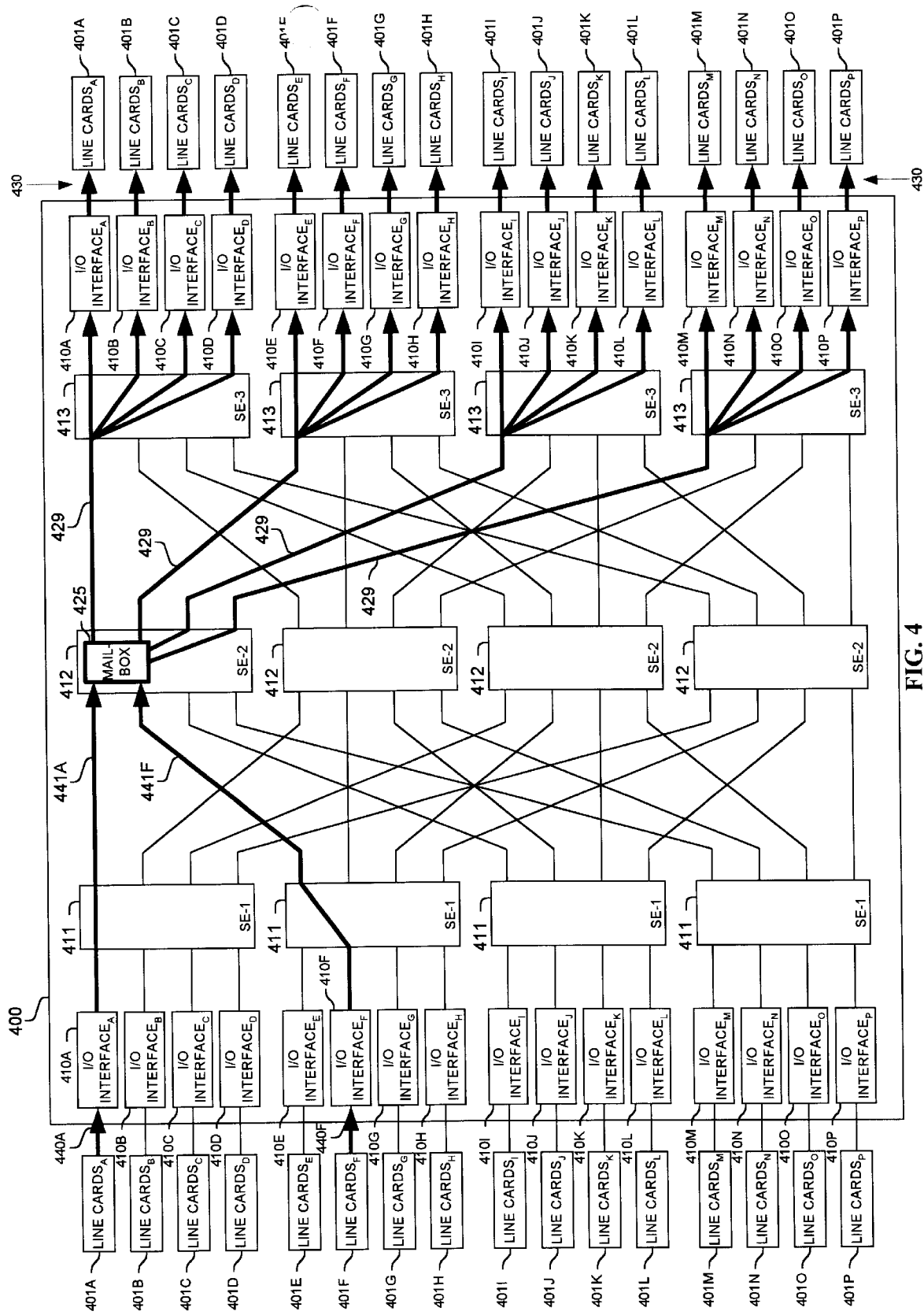
FIG. 4 is a block diagram of illustrating the operation of a mailbox for broadcasting flow control in a packet switching system, FIGS. 5A–F illustrating exemplary packet formats and corresponding data structures used in accumulating and broadcasting flow control information.

FIG. 4 illustrates a logical diagram of the operation of an embodiment for collecting flow control information being sent from one or more line cards (or ports thereof) to all other line cards. In certain embodiments of packet switching systems, it is important to broadcast the status of internal queues and other port status information from an individual port to all other ports (especially those which are communicating with the individual port). The amount of information being sent from the individual port is typically very small, such as on the order of a few bits or bytes, especially when compared to the minimum packet size sent through a packet switch. By accumulating the information from multiple individual ports and then broadcasting the collected flow control information, a vast amount of switch fabric resources (e.g., bandwidth) can be saved.

FIG. 4 illustrates the operation of the collection and broadcast of flow control information using a packet switching system having multiple line cards 401, each connected to an I/O interface 410. Note, the topology illustrated in FIG. 4 is that of a folded packet switch, and that each line card 401 and I/O interface 410 are shown both on the left and right side of FIG. 4 for simplicity of illustration. Also, switch elements SE-1 411 and SE-3 413 are illustrated separately, however in certain embodiments such as that illustrated in FIG. 1C, these are embodied in the same component. Moreover, other embodiments employ a different packet switch topology, such as, but not limited to a non-folded network, which provides some mechanism to convey flow control information from the output or egress portion of the packet switch back to the ingress portion.

A line card 410 having flow control information to be broadcast will send the information to a mailbox 425. For redundancy and efficiency, certain embodiments of a packet switching system will have multiple mailboxes such as one or more per switch fabric or plane. Each of the mailboxes could be allocated to a subset of the line cards 401. Additionally, each of the line cards could send the information to two or more mailboxes for redundancy purposes. As would be understood by one skilled in the art, these and other variations are contemplated and accommodated by the extensible number of possible embodiments.

For example, line card 401A sends flow control information to mailbox 425 via path 440A to 441A. Similarly, line card 401F sends flow control information to mailbox 425 via path 440F to 441F. At certain intervals, mailbox 412, using a packetizer element, creates a packet containing a multitude of flow control messages and distributes to all (or a selected portion thereof in a unicast or multicast function) of the line cards. Packet switch 400 provides a broadcast capability wherein a single message can be sent to all outputs. Alternatively, a multitude of messages could be created with each having a different I/O interface 410 or line card 401 specified as its destination.

FIGS. 5A–B and 5E–F illustrate various formats of a data structure used by an embodiment of mailbox 412 and packet formats for collecting and distributing flow control information. FIGS. 5A–B and 5E–F illustrate the packet format, in which the data payload (e.g., the data fields) of the packets also illustrate a possible embodiment of the data structure (e.g., queue, stack, array, hash table) used to collect the flow control information.

Figure 5A:
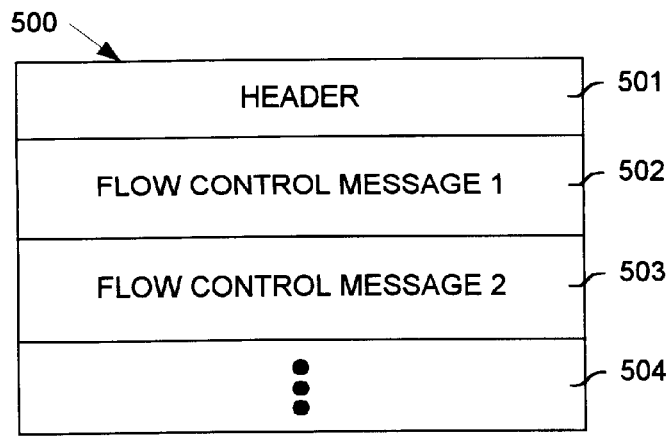

FIG. 5A shows one embodiment of a packet 500 having a header 501 and multiple data fields 502–504, where each data field contains a flow control message. This embodiment uses a queued set of flow control messages where each data field includes the flow control information and an indicator of its source.

Figure 5B:
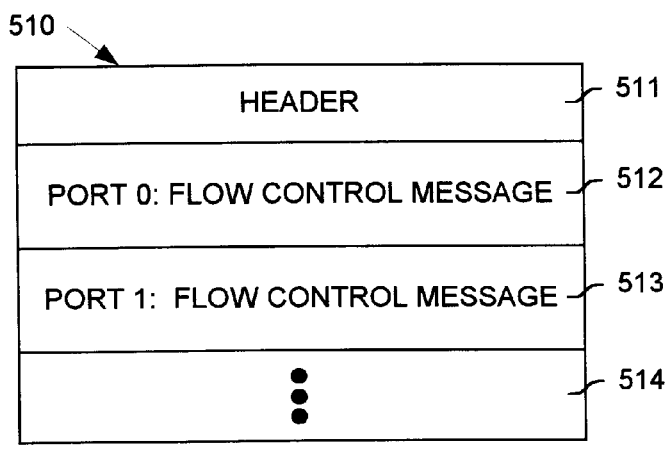

FIG. 5B shows one embodiment of a packet 510 having a header 511 and multiple data fields 512–514, where each data field contains a flow control message. This embodiment uses an array of flow control messages where each data field includes the flow control information at a position within the packet (or data structure) corresponding to the source of the flow control information. For example, data field 512 corresponds to port (or some other identifiable unit such as a line card) 0, data field 513 corresponds to port 1, etc.

Figure 5C:
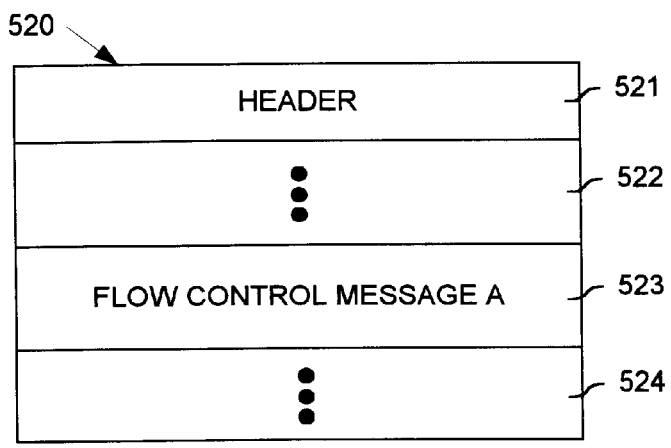
Figure 5D:
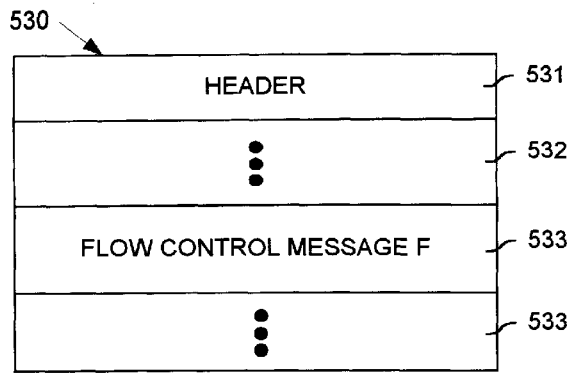
Figure 5E:
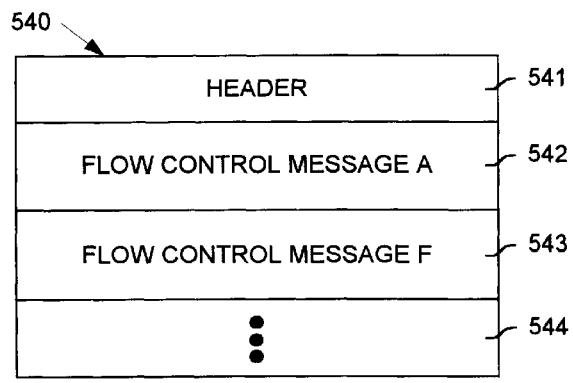
Figure 5F:
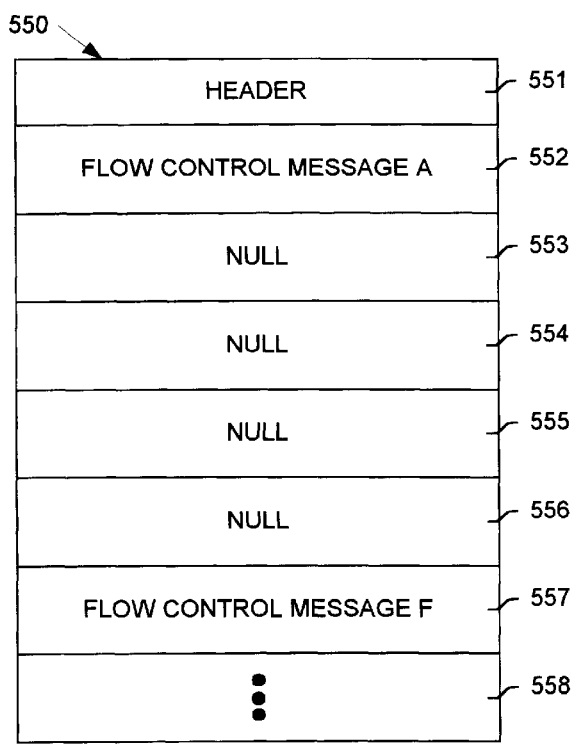

To further illustrate various embodiments, with reference to FIG. 4, line card 401A sends packet 520 (FIG. 5C) to mailbox 425 and line card 401F sends packet 530 (FIG. 5D) to mailbox 425. If mailbox 425 collects and distributes the flow control information in a queue fashion, then mailbox 425 creates packet 540 (FIG. 5E), where the flow control information contained in data fields 523 and 533 has been reproduced in data fields 542 and 543, respectively. If mailbox 425 collects and distributes the flow control information using an array, then mailbox 425 creates packet 550 (FIG. 5F), where the flow control information contained in data fields 523 and 533 has been reproduced in data fields 552 and 557, respectively; and the position of the flow control information within packet 550 indicates its source.

Mailbox 425 can use a multitude of methods for determining how often to distribute the flow control information collected. Various embodiments include when the maintained data structure or distribution packet becomes full, at a regular time interval, after some period of not receiving any flow control information, upon a specific command (e.g., a push operation), or an extensible other number of events or time periods.

Figure 6:
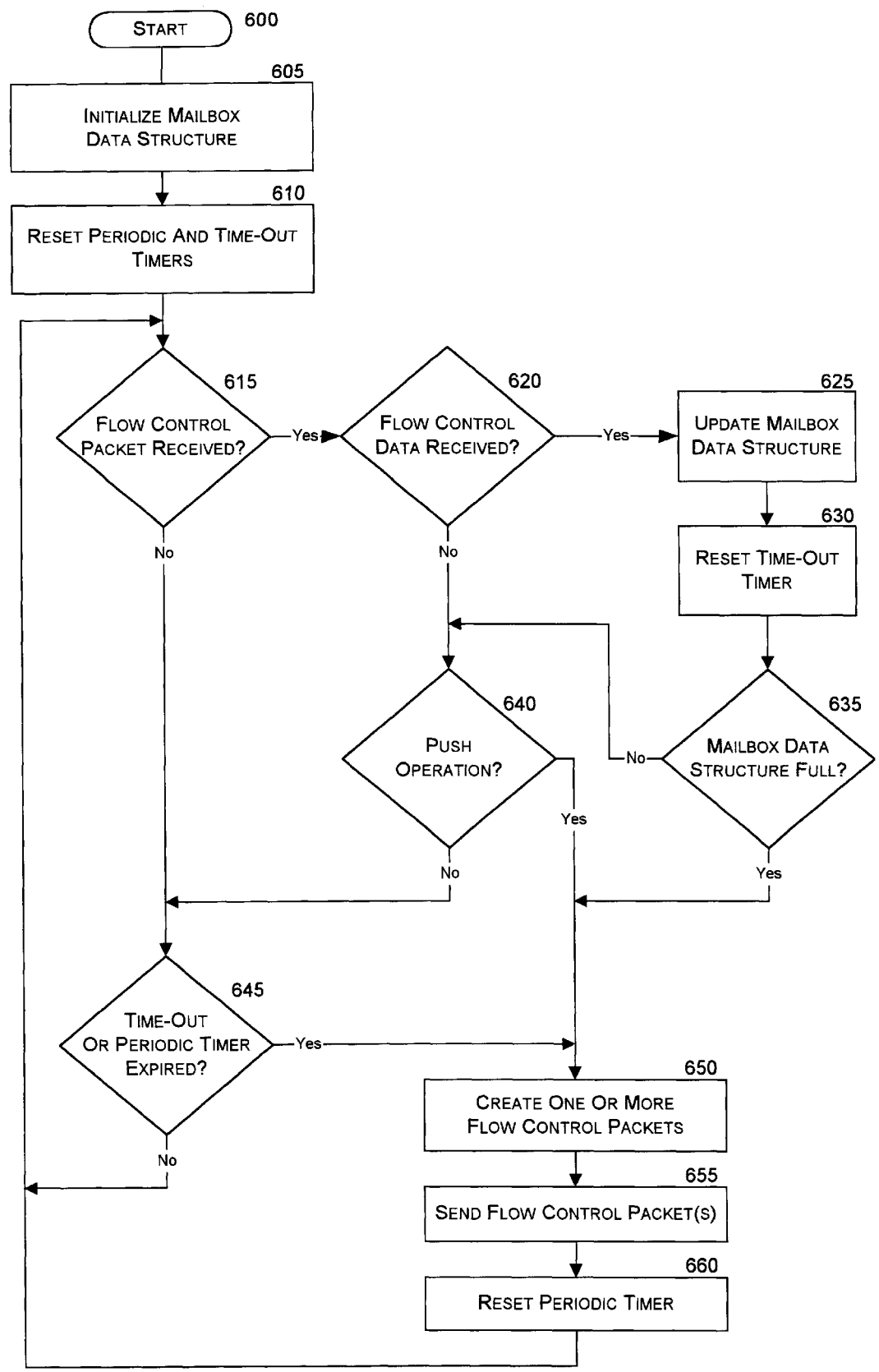
FIG. 6 is a flow diagram of the operation of an embodiment for accumulating and broadcasting flow control information.

The flow diagram of FIG. 6 illustrates some of these possibilities. FIG. 6 may be over inclusive with some steps being ignored in certain embodiments. For example, one embodiment of a system using mailboxes to relay flow control information may use an array data structure (instead of a queue) which may not ever become "full" (as fields could be overwritten with the latest flow control information). Therefore, steps relating to the data structure being full may not applicable to such an embodiment. Additionally, certain embodiments will employ none, some, or all of the timers. If no timers are used, the embodiment would skip those corresponding steps.

Processing of FIG. 6 begins at step 600, and proceeds to step 605 wherein the mailbox data structure is initialized. Next, in step 610, if the embodiment is to send a packet at a regular time interval then a periodic timer is reset, and if the embodiment is to send a packet after a time-out time interval of not receiving any flow control information, then a time-out timer is reset. Next, a loop comprising steps 615 and 645 is performed until either a flow control packet is received or a timer expires.

When either the periodic or time-out timers expires as determined in step 645, steps 650–660 are performed to send one or more flow control broadcast packets.

When a flow control packet is received as determined in step 615, then step 620 is performed to determine if flow control data is received. If so, then steps 625–635 are performed. In step 625, the mailbox data structure is updated with the received flow control information. In step 630, the time-out time is reset. In step 635, the mailbox data structure is checked to see if it is full; and if so, then steps 650–660 are performed to send one or more flow control broadcast packets. Otherwise, step 640 is performed (either after step 620 or step 635) to see if the received flow control packet included an explicit or implicit push operation to ensure a flow control broadcast packet is sent.

In step 650, one or more flow control packets containing the collected flow control information are created, and these packets are sent in step 655. Next, in step 660, the periodic timer is reset as a flow control broadcast packet was just sent. Processing then returns to step 615.

Embodiments also convey flow control information describing the internal conditions of the switch fabric to input line cards. This flow control information may include indications to the line cards of congestion or no-congestion. In response, a line card sending information through a congested portion of the switching system should slow down or stop sending traffic to a particular destination or group of destinations that are determined by the fabric to be in a congested state. In response to flow control information indicating a non-congested state, a line card could resume or increase the rate at which it is sending traffic to the particular destination or group of destinations.

An embodiment for accumulating and distributing flow control information operates using at least two techniques. According to a first technique, for every packet entering the switching system from a line card, the switching system conveys flow control information (typically congestion or both congestion and no-congestion indications) for the packet's destination to the line card. This provides rapid delivery of congestion indications to the line cards, allowing the line cards to react quickly to congestion by rapidly turning off or slowing down sources feeding congested destinations. Using a second technique for distributing flow control information, the switching system will periodically convey congestion and no-congestion indications for all destinations to the line cards. In an embodiment where the first technique only provides congestion indications, this second technique provides the non-congested indications which allows the line cards and their sources to resume or begin sending to the non-congested destinations.

Figure 7A:
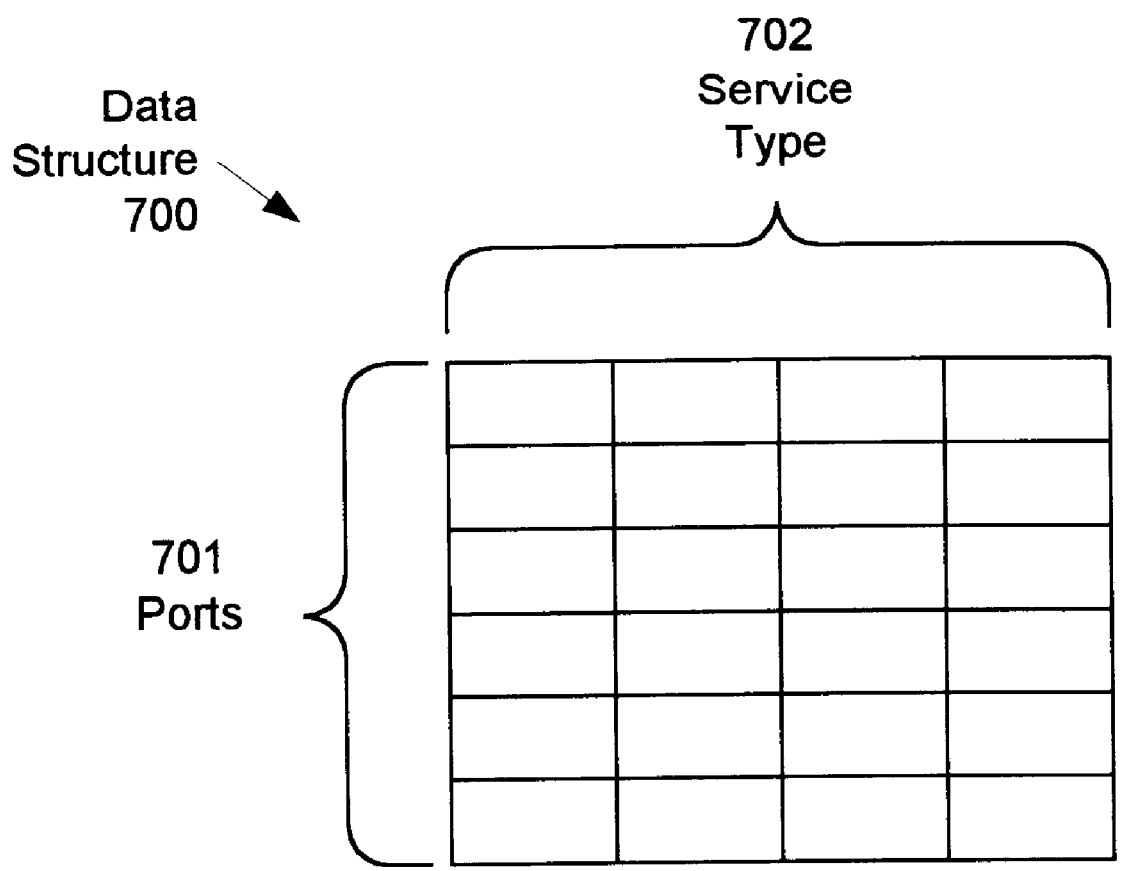
FIG. 7A is an exemplary data structure used to store flow control information.

FIGS. 7A–D and 8A–D describe embodiments for accumulating and conveying flow control information using the two techniques previously described. FIG. 7A illustrates a data structure 700 for storing flow control information. Data structure 700 comprises a table having an entry for each destination (e.g., line card or port of a line card) and for each type of service supported by the packet switching system. Certain embodiments do not make a distinction between service types or only have a single class of service. As shown, data structure 700 has columns 702 corresponding to service types and rows 701 corresponding to each of the output ports of the line cards connected to the switching system. An entry within data structure 700 might be a single bit (e.g., 0 indicates non-congested state and 1 indicates congested state), or could include more bits and thus provide indications of levels of congestion for a particular destination.

Figure 7B:
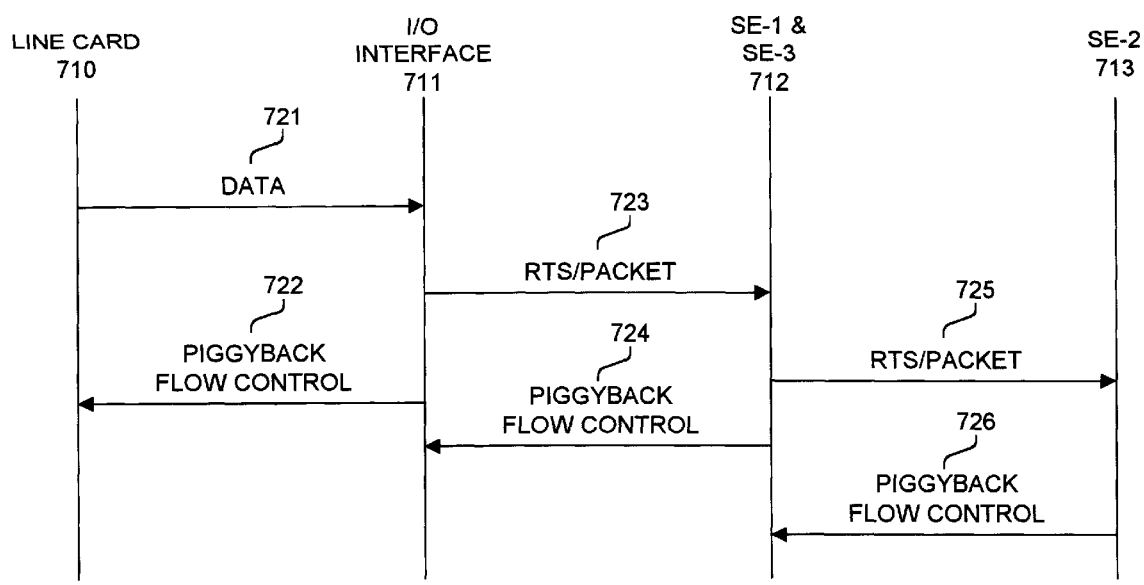
FIGS. 7B–C are message sequence charts illustrating the flow of information among components of a packet switching system.
Figure 7C:
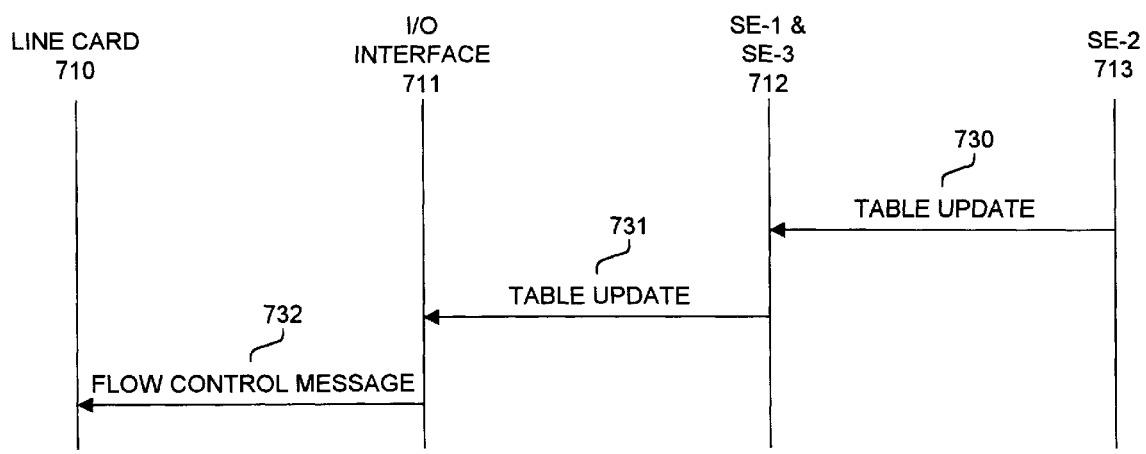

FIG. 7B is a message sequence chart that depicts the first technique of conveying flow control information; while FIG. 7C is a message sequence chart that depicts the second technique of periodically conveying flow control information. Message sequence charts are a well-known format for depicting communication between elements. FIGS. 7B–C both show flow control information passing between a line card 710, I/O interface 711, SE-1 & SE-3 712 and SE-2 713, which could correspond to the packet switching system illustrated in FIG. 1C, and components illustrated in FIGS. 2A–C and 3A–C. However, the teachings disclosed herein are applicable to other embodiments such as for any packet switching system, including those illustrated in FIGS. 1A–B.

FIG. 7B illustrates line card 710 sending a message 721 containing data, typically in the form of a packet, to I/O interface 711. I/O interface 711 receives the data and sends a message 723 to SE-1 & SE-3 712 including a request to send (RTS) for the destination or the data packet itself In response to receiving the data message 721, I/O interface returns control message 722 containing piggyback flow control information to line card 710. In response to receiving the RTS/Packet message 723, SE-1 & SE-3 712 returns control message 724 containing piggyback flow control information to I/O interface 711. Similarly, in response to receiving the RTS/Packet message 723, SE-1 & SE-3 712 sends RTS/Packet message 725 to SE-2 713, and receives in response control message 726 containing piggyback flow control information. It is important to note, that the piggyback flow control information returned could be for the destination corresponding to the data or packet causing the control message response, or it could correspond to the destination of a previous packet having been delayed within some protocol window. Using a windowing protocol technique, a control message is not delayed while the component extracts the destination and looks up in its flow control data structure the flow control state for the destination. Also, the piggyback flow control information could be NULL (i.e., not included) if for instance, the embodiment only piggybacks congested indications, and the flow control data structure indicates the destination is in a non-congested state.

FIG. 7C illustrates an embodiment for periodically distributing the flow control information using the second technique. SE-2 713 periodically sends a table update message 712 to each of its connected SE-1 & SE-3 switching elements, which in turn forwards the received flow control information in table update message 731 to I/O interface 711. In response I/O interface 711 determines the changes in the flow control information based on the received table update message 731, and creates and sends a flow control message 732 containing an indication of such changes. In other embodiments, I/O interface 711 forwards all flow control information and not just the changes.

Figure 7D:
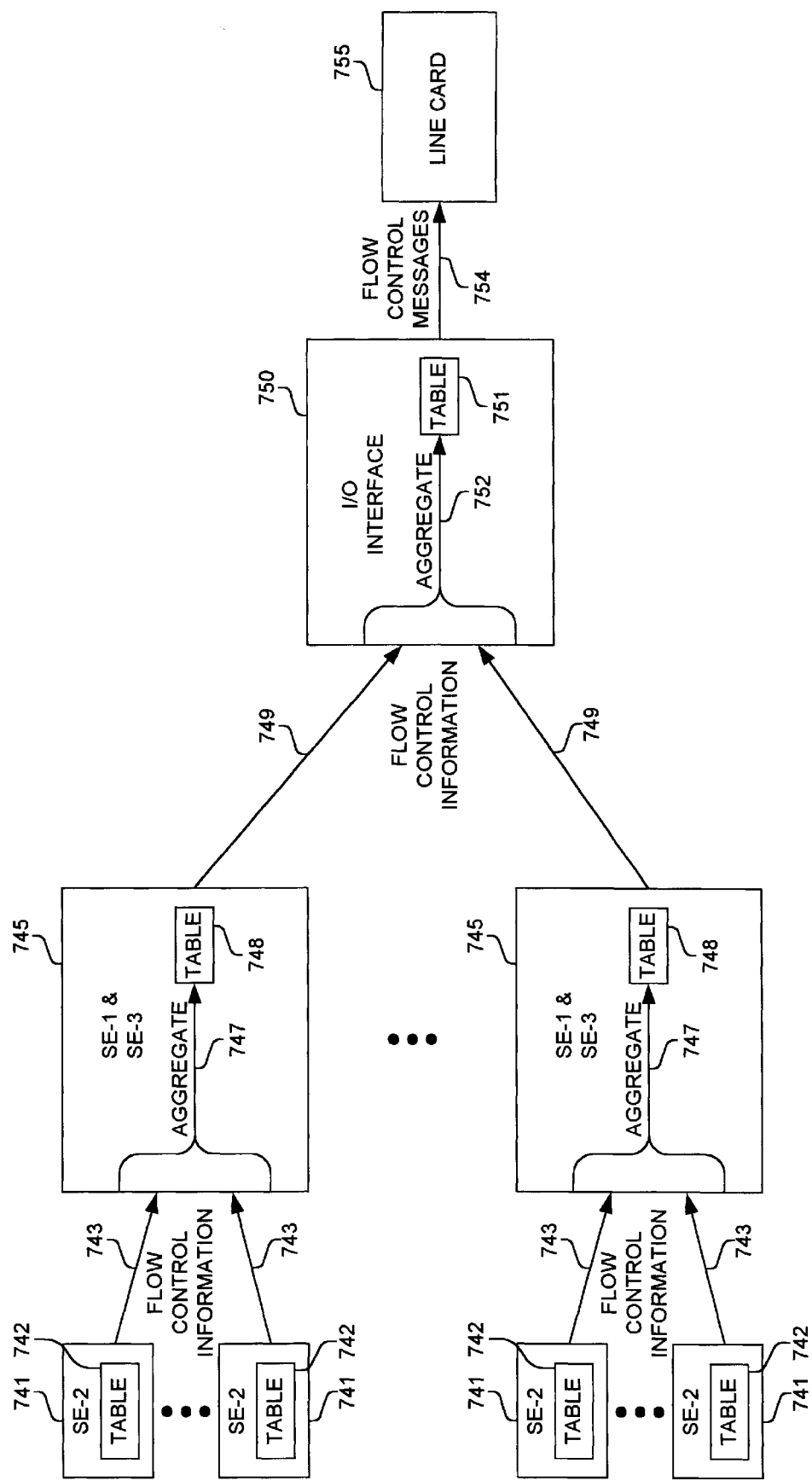
FIG. 7D is a block diagram illustrating the flow and aggregation of flow control information.

The collection and distribution of the flow control information using this two technique scheme is better understood in relation to FIG. 7D. Shown is a block diagram illustrating the logical flow and aggregation of flow control information in an embodiment. Starting with the right of the diagram, each line card 755 receives flow control messages 754 from an I/O interface 750 of a packet switching system. Each I/O interface 750 receives multiple flow control information messages 749 from multiple SE-1 & SE-3 components 745. Each SE-1 & SE-3 components 745 receives multiple flow control information messages 743 from multiple SE-2 components 742. A flow control data structure 742, 748, and 751 is maintained respectively by SE-2 components, SE-1 & SE-3 components, and I/O interface 750 (and possibly in the line card 755). These flow control data structures 742, 748, and 751 could be in the form of data structure 700 illustrated in FIG. 7A or in another form.

As each SE-1 & SE-3 component 745 receives flow control information messages 743, the flow control information indicated within these messages 743 are aggregated (as indicated by aggregator 747) and stored in the flow control data structure 748. Similarly, as each I/O interface 750 receives flow control information messages 749, the flow control information indicated within these messages 749 are aggregated (as indicated by aggregator 752) and stored in the flow control data structure 751. Flow control messages 743 and 749 include flow control data structure update messages and piggyback flow control messages. Different embodiments aggregate the received flow control information in various manners, such as directly replacing or updating information stored in the flow control data structure 748 or 751 with the received flow control information, or using a set of relative weights and thresholding an individual value with information stored in the flow control data structure 748 or 751 to determine whether the item corresponds to a congested or non-congested condition.

The flow diagrams of FIGS. 8A–B and 8C–D illustrate the processing and distribution of flow control information for update messages and piggyback flow control messages, respectively.

Figure 8A:
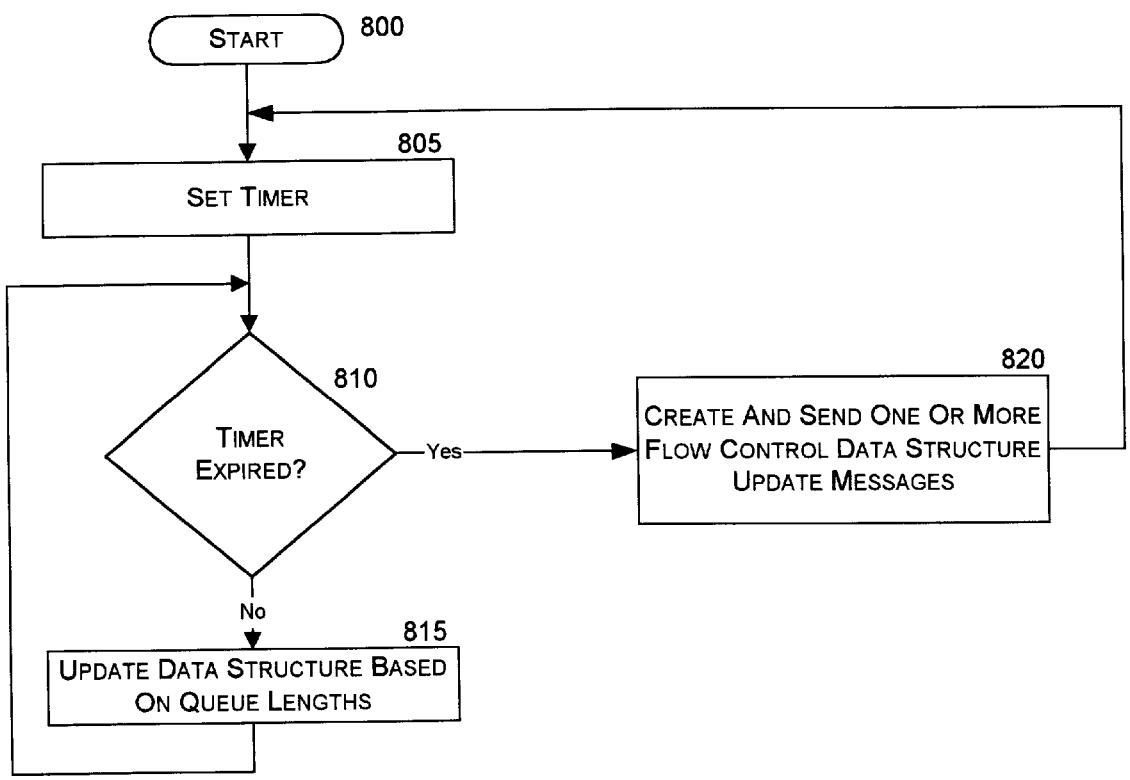
FIGS. 8A–D are flow diagrams for accumulating and distributing broadcast and piggyback flow control information.

First, FIG. 8A describes an embodiment for distributing the update messages on a periodic basis for a SE-2 component. Processing begins at step 800, and proceeds to step 805 where a timer is set to the update period. While the time has not expired as determined in step 810, the flow control data structure is continuously updated in step 815 based on the queue lengths. When the timer has expired, step 820 is performed to create and send one or more flow control data structure update messages, and processing returns to step 805.

Figure 8B:
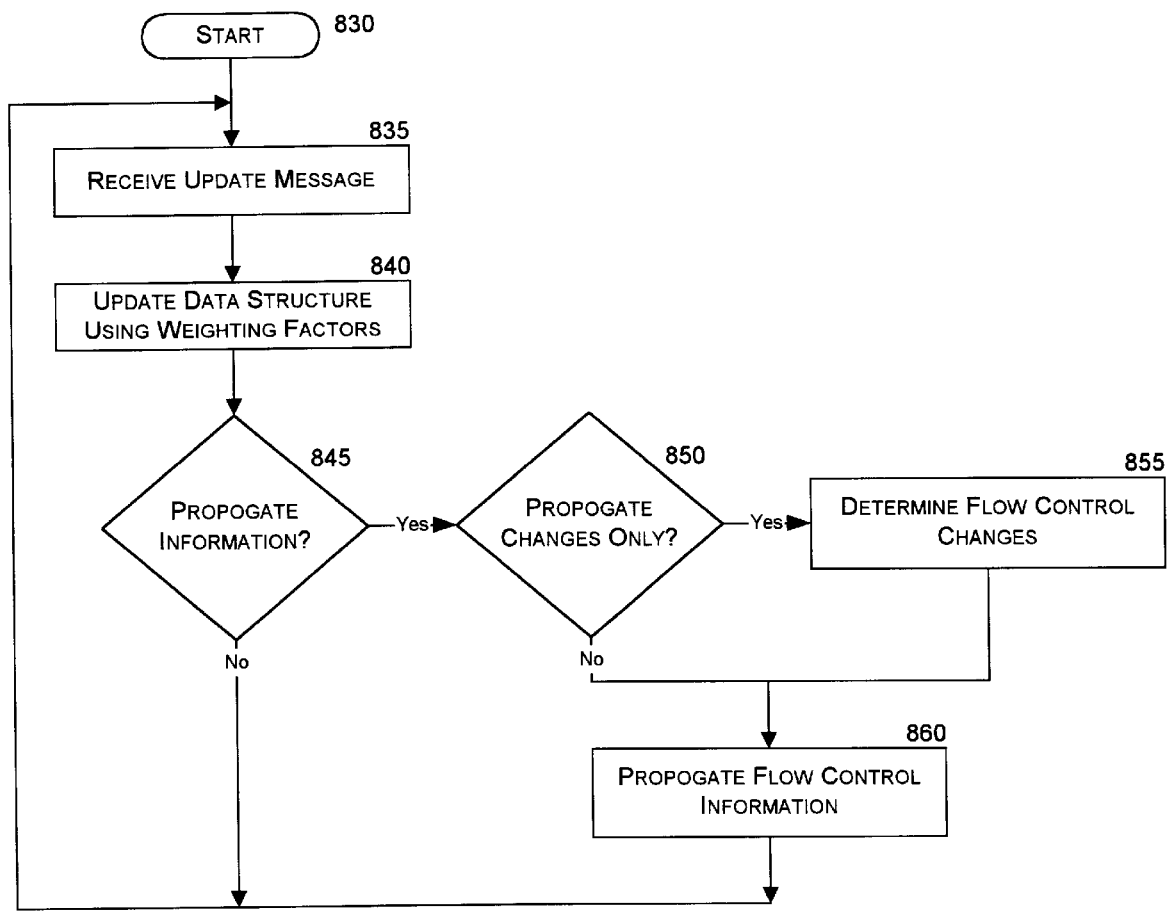

Next, FIG. 8B describes an embodiment of a SE-1 & SE-3 component and input/output interface for receiving flow control update messages and propagating the flow control information to other components. Processing begins at step 830, and proceeds to step 835 where a flow control update message is received. Next, in step 840, the flow control data structure is updated using weighting factors. In one embodiment, these weighting factors depend on the type of flow control message received (i.e., for update messages and piggyback flow control messages). Next, in step 845, if this component is designed to immediately propagate the received flow control information or a timer has expired, then step 850 is performed to determine whether to propagate the received update message, the entire or selected portion of the flow control data structure, or only newly received changes. Step 855 is performed to propagate only newly received changes, while step 860 is performed to propagate the received update message or the entire or selected portion of the flow control information data structure. Processing then returns to step 835.

Figures 8C, 8D:
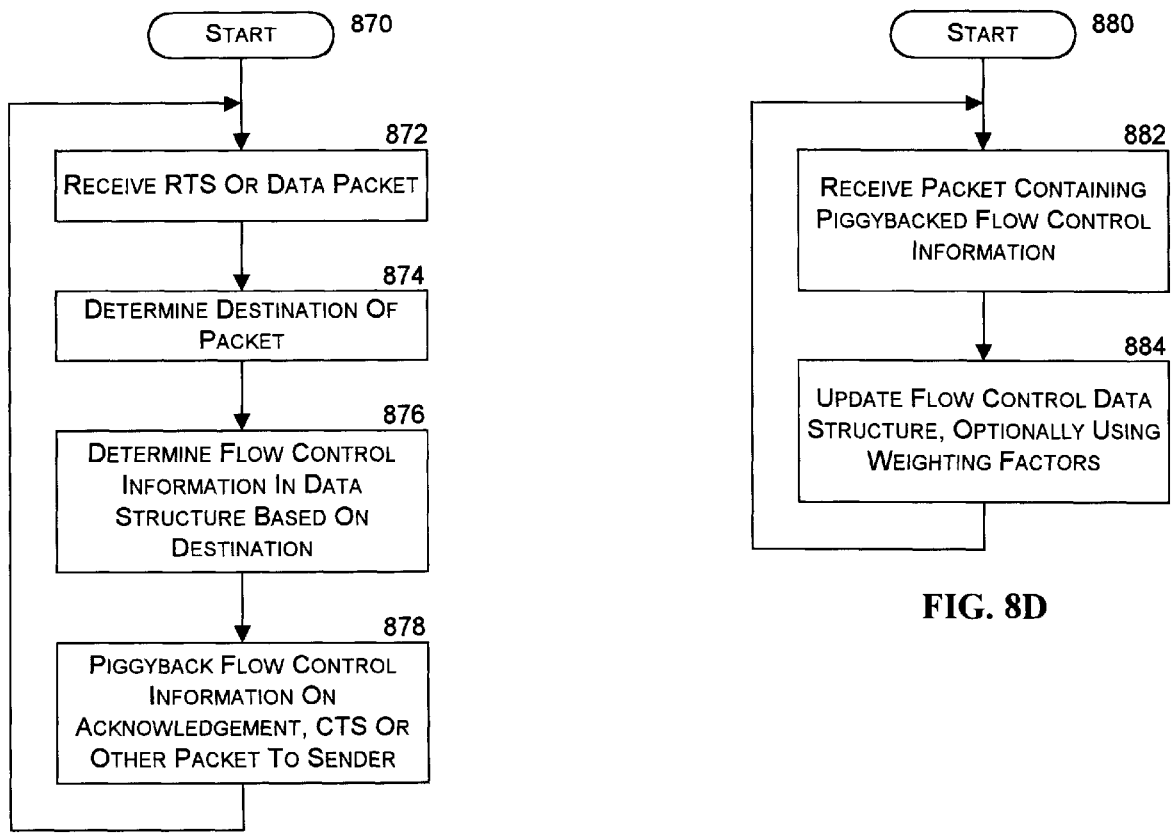

FIG. 8C illustrates steps performed for propagating piggyback flow control information in one embodiment. Processing begins at step 870 and proceeds to step 872 where a request-to-send (RTS) control packet or the data packet itself is received. Next, in step 874, the destination of the packet or packet corresponding to the RTS is determined, and used in step 876 to lookup in the flow control data structure the stored flow control condition or state for the destination. In an embodiment using weighting factors, the retrieved value is compared to a predetermined threshold value or set of values to determine this condition or state.

Next, in step 878, this determined flow control information is then piggybacked on a control message being sent to the source. Processing then returns to step 872.

FIG. 8D illustrates steps performed by a component for updating based on piggybacked flow control information in one embodiment. Processing begins in step 880, and proceeds to step 882 where the control packet containing the piggybacked flow control information is received. The component then extracts the received flow control information and updates its flow control data structure, possibly using weighting factors, in step 884. Processing then returns to step 882 to receive more flow control information.

As disclosed herein, flow control information is distributed and aggregated by a packet switching system using various techniques and by an extensible number of embodiments. In one embodiment, the line card maintains its own data structure indicating flow control information for at least the destinations it is communicating with or all possible destinations to which it can send information. As described herein, flow control information is delivered to the line card for each destination. Therefore, it is possible for the line card to selectively hold or throttle-back its data being transmitted to the congested ports and/or line cards, rather than shutting off all transmission traffic. Thus, non-congested destinations can continue to receive data. In one embodiment, a line card will maintain a queue in its memory for each destination it is sending data. Control logic then controls the placing of the incoming data into these queues and for taking the data out of the queues and sending the data, typically in the form of packets, to the packet switch.

When there is no congestion in the packet switch or at the output line card, then all line cards can send their data without concern. However, after a period of congestion, when the line card has stored information waiting to transmit, the line card must employ some method to transmit the queued information as well as newly arriving information. Thus, the line card must allocate the bandwidth of the link to the packet switch among the packets containing the received information.

One such scheme is to proceed round-robin among all queues containing packets. This would seem to fairly allocate the outgoing bandwidth or packet times among the destinations requiring service. However, such a scheme allows a congested or previously congested destination to interfere with the transmission of packets to a non-congested destination.

Certain embodiments isolate the effect of congested destinations and queues containing multiple data items through a fair distribution allocation scheme which overcomes the previously mentioned artifact. In an embodiment, as information arrives at a line card, priority outgoing packet time slots are allocated for that destination. In this fashion, each traffic going to the destination is given the opportunity to be sent at its arrival rate. In the remaining bandwidth or packet cycles available on the outgoing link, the destination queues containing information retained due to a congestion condition are serviced. Spare bandwidth and packet times are typically available because the outgoing packet rate from the line card to the packet switch is typically engineered to be faster than the incoming packet rate to the line card for arriving data, or because incoming packet traffic may not be entering at full line rate. Additional bandwidth and packet times become available when other destinations become congested.

Figure 9A:
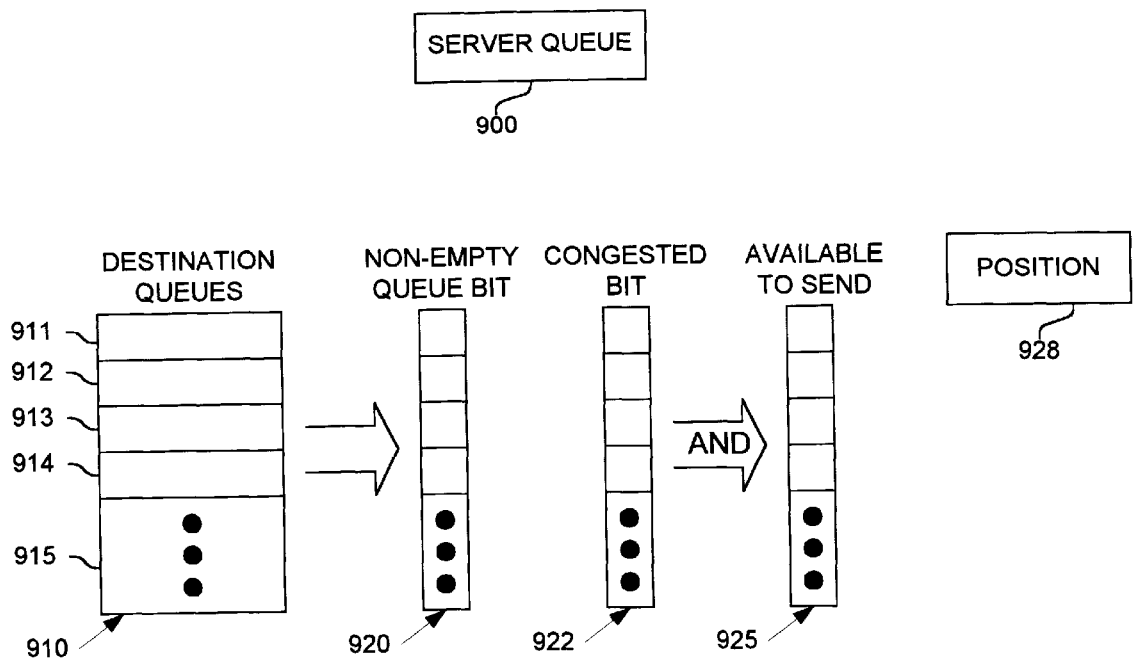
FIG. 9A is a block diagram illustrating data structures used and manipulation by a .component in reacting to the received flow control information.

A logical view of a line card is illustrated in FIG. 9A, showing multiple destination queues 910 and a server queue

900. As data arrives, an embodiment of the line card partitions the data into units and places these in the appropriate destination queue 911–915. Each unit corresponds to the data which will be contained in a single packet sent to the packet switching system. As each packet or unit is created, a server identifier of the destination queue 911–915 is placed in the server queue 900. The line card then removes these server identifiers in the order placed in the server queue, looks up in its data structure 922 containing flow control information to see whether it can send to the destination (e.g., if the destination is not indicated as congested). If so, a data unit is removed from the appropriate destination queue 911–915 and a packet is sent to the destination. If the destination is congested, then the line card removes and processes the next server identifier from the server queue 900.

While the server queue 900 is empty, then the line card services any destination queues 911–915 containing units of data to be sent. (However, as data is received, the server queue receives a server identifier which is processed before any more other destination queues 911–915). FIG. 9A illustrates an efficient way, especially in hardware, to fairly allocate the spare bandwidth to the backed-up destination queues. A non-empty queue bitmap 920 having an entry for each destination queue 911–915 is maintained to reflect when there is a data unit in the corresponding destination queue 911–915. This bitmap is then AND'ed with the flow control data structure 922 to produce an available to send bitmap 925 which also has an entry for each destination queue 911-915. In this manner, if a bit is set in the available to send bitmap 925, then the line card can send a packet to the corresponding destination. The line card also maintains a position memory 928 which maintains an indication of the last destination sent a packet using the spare bandwidth, which allows the line card to sequence through the destinations. As would be understood by one skilled in the art, numerous other allocation methods could be used for allocating the spare bandwidth to the backed-up destinations.

Figure 9B:
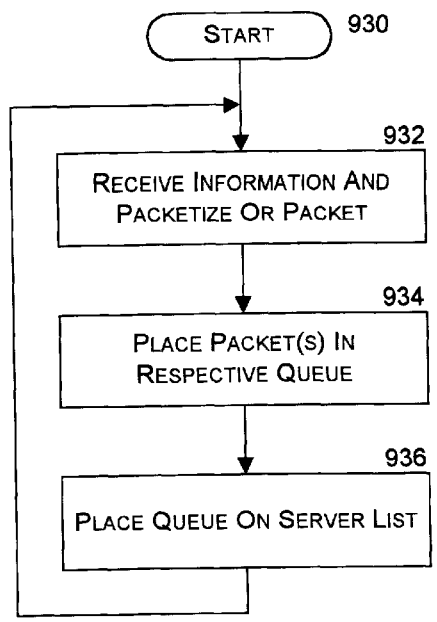
FIGS. 9B–C illustrate an embodiment for receiving and sending packets.
Figure 9C:
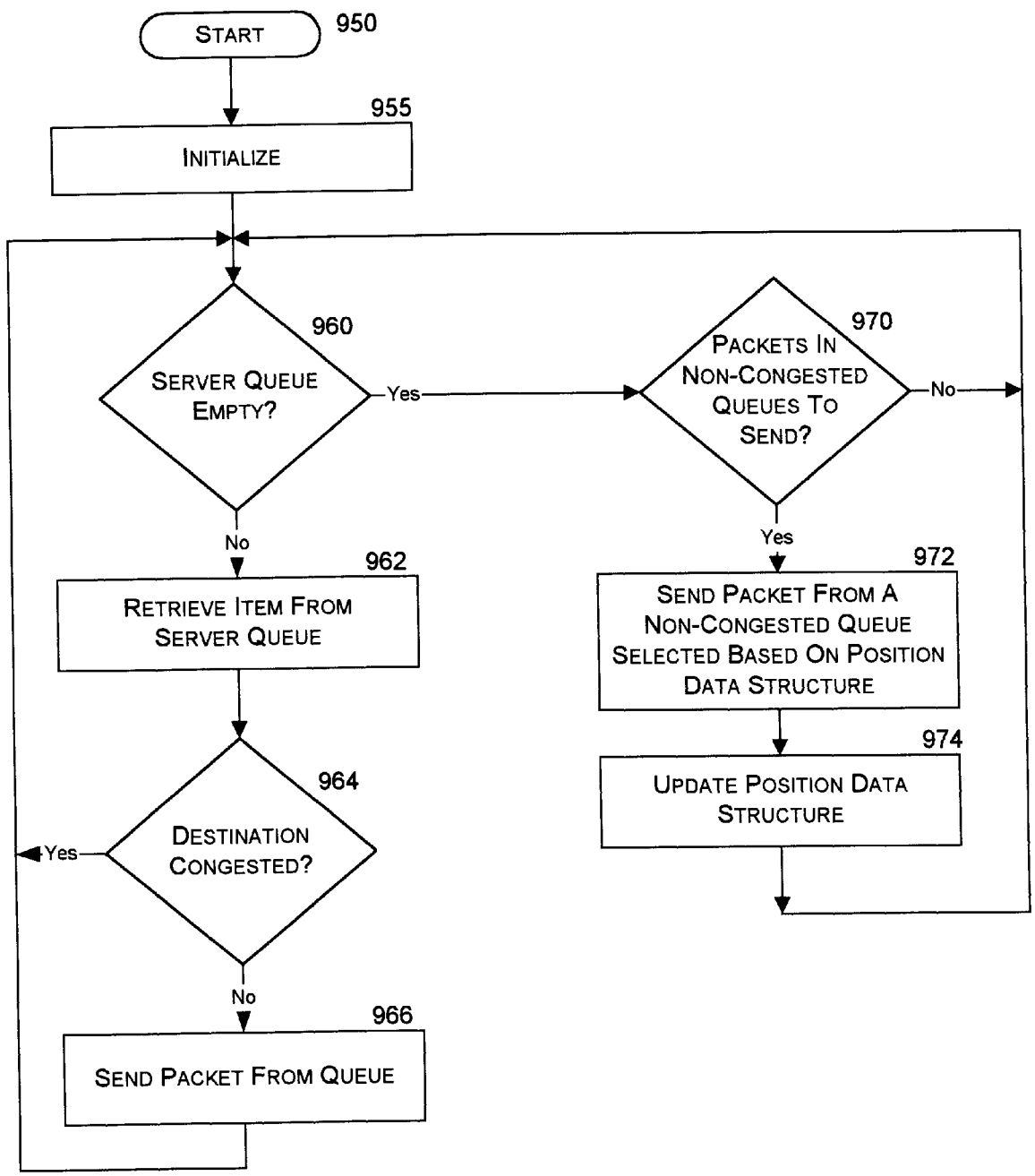

FIGS. 9B–C illustrate embodiments of the line card for sending data packets based on the flow control information maintained in its flow control data structure. Processing of FIG. 9B begins at step 930, and proceeds to step 932 where the line card receives (1) information and packetizes this information or (2) directly receives a packet. Next, in step 934, these packet(s) or data unit(s) are placed in the corresponding destination queue. Then, in step 936, an identifier of the destination queue is placed in the server queue for each packet placed in the server queue. Processing then returns to 932.

In parallel, the steps of FIG. 9C are processed to send out the received information in the form of packets to the packet switch. Processing begins at step 950 and proceeds to step 955 where the line card initializes its data structures and position memory. Then, as determined in step 960, if there is an identifier in the server queue, steps 962–966 are processed. In step 962, the identifier is retrieved from the head of the server queue. Next, as determined in step 964, if the corresponding destination is not congested, then the line card removes the data unit or packet from the head of the corresponding destination queue and sends a packet containing this information to the packet switch. Processing then returns to step 960 to continue to process identifiers from the server queue.

When the server queue is empty as determined in step 960, then, if there are any packets or data units in a non-congested destination queue to send as determined in step 970, then step 972 is performed to send the packet from a non-congested destination queue based on the value of the position data structure 928 (FIG. 9A). The value of the data structure is then updated in step 974 based on the destination of the packet sent in step 972, and processing returns to step 960.

Figure 10A:
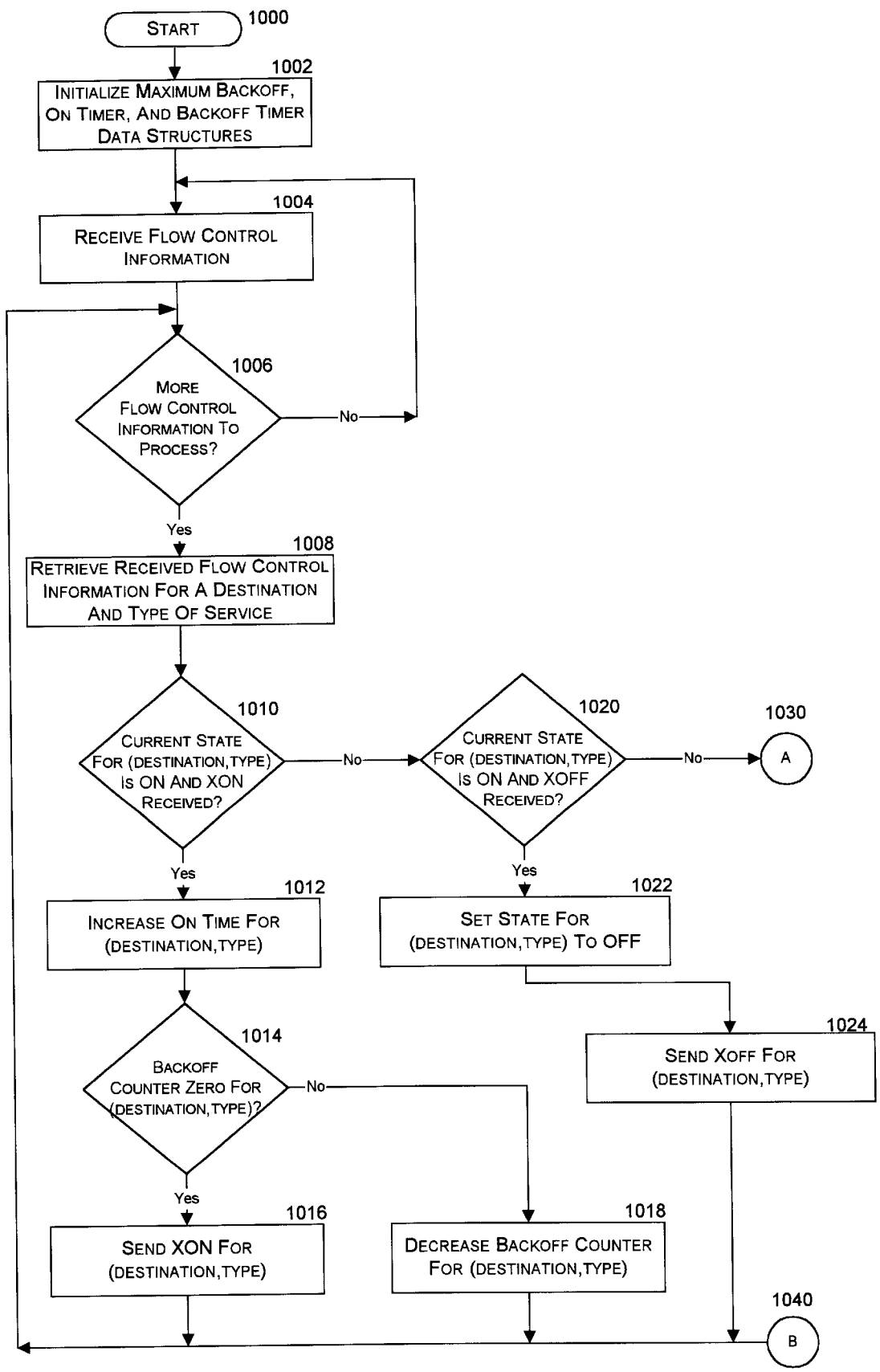
FIGS. 10A–B illustrate an embodiment for determining when to stop and start sending packets in response to received flow control information.
Figure 10B:
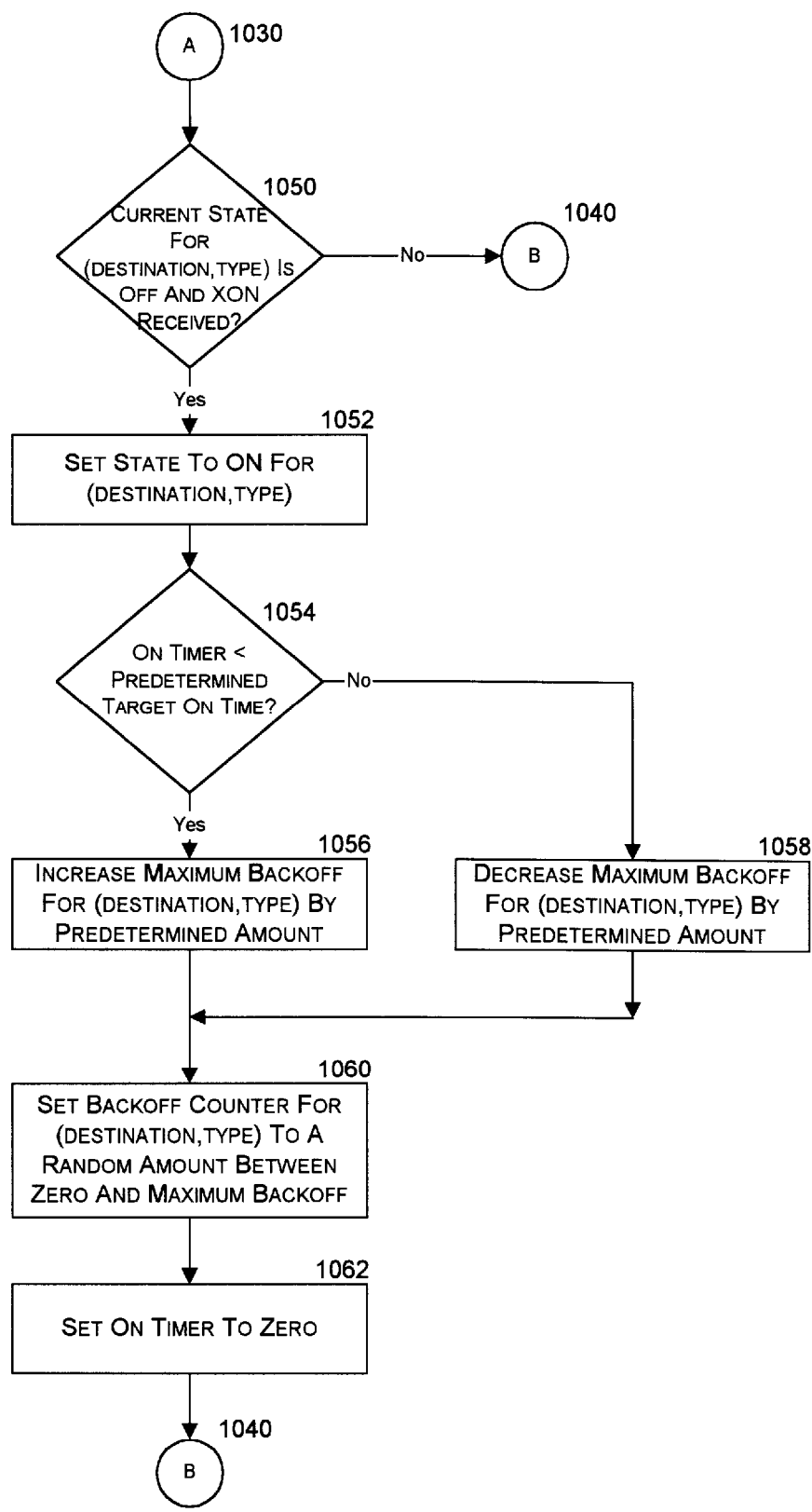

FIGS. 10A–B illustrate one embodiment for determining a backoff delay which a component of the packet switching system delays before sending a packet to a destination after receiving flow control information indicating that the component is allowed to send packets (e.g., receives an XON) when the component has not been allowed to send a packet to the destination (e.g., in an XOFF condition for the destination). The embodiment illustrated in FIGS. 10A–B responds to the broadcast flow control messages disclosed herein. However, other embodiments could respond to these and other flow control messages or indications (e.g., piggyback flow control messages, electric signals, etc.).

When responding to broadcast flow control messages, many different components that have packets to a same output will receive an indication that they are now allowed to send these packets at roughly the same time as the other components. If all components start sending at the same time, then the packet switch might become congested, possibly very quickly. If the packet switch cannot respond and transmit flow control messages to all of these sources fast enough, certain internal buffers could overflow and thus packets might be lost. Embodiments, such as that illustrated in FIGS. 10A–B, cause different components to start sending to the destination at varying times to gradually increase the traffic being sent to the destination. In this manner, the traffic in the packet switch gradually rises which allows buffers within the packet switch to drain while new traffic is arriving, and allows the packet switch time to react and throttle-back the traffic in a reasonable manner should paths leading to the output become congested.

Referring to FIG. 10A, processing begins at step 1000, and proceeds to step 1002, wherein a Maximum Backoff, On Timer, and Backoff Timer data structures are initialized. These data structures in one embodiment are two-dimensional arrays, where an entry is maintained for each type of service for each destination (similar to that of the data structure illustrated in FIG. 7A). Initially, each entry of these data structures is set to zero. The Maximum Backoff data structure may be used to indicate a range of possible values or time periods for the backoff delay for each entry. The On Timer backoff data structure is used to measure a previous congestion parameter, such as a previous duration of time that packets were allowed to be sent for each entry. The Backoff Timer data structure is used in delaying packets from being sent for a determined backoff period of time after receiving flow control allowing packets to be sent to the destination for the type of service. In other embodiments, one or more of these data structures could be implemented as timers or counters. Moreover, as illustrated in FIG. 10A, the On Timer and Backoff Timer data structures are updated in response to receipt of a periodic flow control messages. In other embodiments, one or both of these data structures are updated at regular intervals and/or independently of the receipt of flow control messages. Additionally, the On Timer and Backoff Timer data structures could be used to measure time periods having a different granularity than that of the periodic time receipt of flow control messages.

Flow control information is received in step 1004. The embodiment described in FIGS. 10A–B relies on broadcast flow control messages, which are received periodically, usually at regular intervals. These broadcast flow control messages may contain flow control information for each type of service for each destination. Next, while there are received flow control entries remaining to be processed as determined in step 1006, steps 1008–1062 are performed to process an entry. When all flow control entries have been processed, processing returns to step 1004 to receive more flow control information. Of course, certain steps illustrated in the flow diagram of FIGS. 10A–B can be performed in parallel within the scope and spirit of the disclosed invention as would be apparent to one skilled in the art.

In step 1008, a received entry for a destination and type of service is selected to be processed, hereinafter referred to as "(destination, type)". In other embodiments, flow control information or the delay might be calculated based only on the destination or only on the type of service. Next, in step 1010, if the current state for the selected (destination, type) is ON (e.g., previously allowed to send packets to the (destination, type)) and the received flow control information is XON (e.g., now allowed to send packets to the (destination, type)), as determined in step 1010, then step 1012 is performed to increase the entry in the On Timer data structure for the (destination, type), as packets continue to be allowed to be sent to (destination, type). Next, if the (destination, type) entry in Backoff Timer is zero, as determined in step 1014, then packets are allowed to be sent to (destination, type), and packets begin to be sent out to (destination, type). This may cause an XON indication to be sent to another component (e.g., a line card) or another element of the component (e.g., a packet processor). The setting of the value of Backoff Timer will be described further hereinafter in relation to steps 1054–1060. Otherwise, the (destination, type) entry in Backoff Timer is decreased in step 1018 as the backoff delay duration has not expired, and the component continues to delay before sending packets to (destination, type).

Otherwise, as determined in step 1020, if the current state for the selected (destination, type) is ON (e.g., previously allowed to send packets to the (destination, type)) and the received flow control information is XOFF (e.g., now not allowed to send packets to the (destination, type)), then the flow control data structure is updated as previously discussed herein with the XOFF information in step 1022. This may cause an XOFF indication to be sent to another component (e.g., a line card) or another element of the component (e.g., a packet processor) in step 1024.

Otherwise, processing continues to, and returns from, FIG. 10A as indicated by connectors 1030 and 1040. If the current state for the selected (destination, type) is OFF (e.g., previously not allowed to send packets to the (destination, type)) and the received flow control information is XON (e.g., now allowed to send packets to the (destination, type)), then the flow control data structure is updated as previously discussed herein with the XON information in step 1052. Next, if the On Timer entry for (destination, type) is less than a predetermined targeted on time duration, as determined in step 1054, then step 1056 is performed to increase the Maximum Backoff value for (destination, type) by a predetermined amount. Otherwise, step 1058 is performed to decrease the Maximum Backoff value for (destination, type) by a predetermined amount. These steps either increase or decrease the maximum backoff delay. Next, in step 1060, the Backoff Counter for (destination, output) is set to a random number between zero and value of the (destination, type) entry in Maximum Backoff. Next, the On Timer entry for (destination, type) is reset to zero, and processing returns to FIG. 10A.

In view of the many possible embodiments to which the principles of our invention may be applied, it will be appreciated that the embodiments and aspects thereof described herein with respect to the drawings/figures are only illustrative and should not be taken as limiting the scope of the invention. To the contrary, the invention as described herein contemplates all such embodiments as may come within the scope of the following claims and equivalents thereof

What is claimed is:

1. A method for propagating flow control information in a packet switching system including a first element and a second element, the method comprising:

the first element sending a first flow control data structure update message to a second element, the first flow control data structure update message including a first portion of said flow control information; and the first element sending a first non-flow control message to the second element, the first non-flow control message including a second portion of said flow control information.

2. The method of claim 1, wherein the first non-flow control message is an acknowledgment message.

3. The method of claim 1, wherein the first non-flow control message is a clear-to-send message.

4. The method of claim 1, further comprising the second element aggregating the first and second portions of said flow control information included in the first non-flow control message and the first flow control data structure update message in a first flow control data structure.

5. The method of claim 4, wherein said aggregating the first and second portions of said flow control information includes applying a first weighting factor to the first portion of said flow control information and a second weighting factor to the second portion of said flow control information.

6. The method of claim 4, wherein the packet switching system includes a third element; and wherein said method further comprises:

the second element sending a second flow control data structure update message to the third element, the second flow control data structure update message including a first aggregated portion of flow control information included in the first flow control data structure; and the second element sending a second non-flow control message to the third element, the second non-flow control message including a second aggregated portion of flow control information included in the first flow control data structure.

7. The method of claim 6, wherein said flow control information included in the first and second flow control data structure update messages consists of an identical subset of the first flow control data structure.

8. The method of claim 6, further comprising the third element sending one or more third flow control messages to a line card.

9. The method of claim 6, further comprising the third element aggregating the flow control information included in the second non-flow control message and the second update message in a second flow control data structure.

10. The method of claim 9, further comprising the third element updating the second flow control data structure by applying the first weighting factor to the flow control information contained in the second non-flow control message and the second weighting factor to the flow control information contained in the second flow control data structure update message.

11. The method of claim 4, further comprising the second element updating a congestion indication maintained in the first flow control data structure for each output of the packet switching system.

12. The method of claim 11, further comprising the second element updating a congestion indication maintained in the first flow control data structure for a plurality of outputs of the packet switching system; and wherein the first flow control data structure update message includes an indication of congestion or no congestion for each of the plurality of outputs of the packet switching system.

13. The method of claim 12, wherein the first non-flow control message never indicates a non-congested condition.

14. A packet switching system comprising:
   a first switch element including a first flow control data structure;
   a second switch element including a second flow control data structure;
   a third switch element including a third flow control data structure; and
   a plurality of communications mechanisms transferring a plurality of flow control data structure update messages and a plurality of non-flow control messages containing flow control information between the first and second switch elements and between the second and third switch elements.

15. The packet switching system of claim 14, wherein the first switch element further includes a plurality of queues, and the first switch element updates the first flow control data structure based on occupancy of the queues.

16. The packet switching system of claim 15, wherein the first switch element maintains a queue for each output of the packet switching system.

17. The packet switching system of claim 15, wherein the first switch element maintains a queue for each service class for each output of the packet switching system.

18. The packet switching system of claim 14, wherein each of the first, second and third flow control data structures include an entry for each output of the packet switching system.

19. The packet switching system of claim 14, wherein each of the first, second and third flow control data structures include an entry for each service class for each output of the packet switching system.

20. A method performed by a packet switching system, the method comprising:
   a plurality of first switch elements maintaining a first flow control data structure;
   the plurality of first switch elements sending a plurality of flow control data structure update messages and a plurality of non-flow control messages containing flow control information to a second switch element; and
   the second switch element updating a second flow control data structure based on the flow control information included in the plurality of flow control data structure update messages and in the plurality of non-flow control messages containing flow control information.

21. The method of claim 20, wherein the second element updating the second flow control data structure comprises applying a first weighting factor to the flow control information contained in the flow control data structure update messages and a second weighting factor to the flow control information contained in the plurality of non-flow control messages containing flow control information.

22. The method of claim 20, further comprising the plurality of the first switch elements updating the first flow control data structures based on the occupancy of a plurality of queues maintained by the plurality of the first switch elements.

23. The method of claim 22, further comprising each of the plurality of first switch elements maintaining a queue for each output of the packet switching system.

24. The method of claim 22, further comprising each of the plurality of first switch elements maintaining a queue for each service class for each output of the packet switching system.

\* \* \* \* \*

UNITED STATES PATENT AND TRADEMARK OFFICE
CERTIFICATE OF CORRECTION

PATENT NO. : 6,654,342 B1  
DATED : November 25, 2003  
INVENTOR(S) : Dittia et al.

It is certified that error appears in the above-identified patent and that said Letters Patent is hereby corrected as shown below:

Column 2,  
Lines 45 and 53, replace "system," with -- system; --  
Line 50, replace "components," with -- components; --  
Line 60, replace "information," with -- information; --

Column 3,  
Line 5, replace ".component" with -- component --  
Line 31, replace "Aggregating" with -- Aggregating, --

Column 11,  
Line 33, replace "separately," with -- separately; --

Column 14,  
Line 17, replace "itself In" with -- itself. In --

Column 20,  
Line 7, replace "thereof" with -- thereof. --

Signed and Sealed this

Fifteenth Day of February, 2005

JON W. DUDAS  
*Director of the United States Patent and Trademark Office*